United States Patent
Kuo

(10) Patent No.: US 11,582,818 B2
(45) Date of Patent: Feb. 14, 2023

(54) METHOD AND APPARATUS FOR FORWARDING SIDELINK USER EQUIPMENT (UE) CAPABILITY INFORMATION IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 119 days.

(21) Appl. No.: 17/329,433

(22) Filed: May 25, 2021

(65) Prior Publication Data

US 2021/0410214 A1    Dec. 30, 2021

Related U.S. Application Data

(60) Provisional application No. 63/045,691, filed on Jun. 29, 2020.

(51) Int. Cl.
*H04W 4/00* (2018.01)
*H04W 76/14* (2018.01)
*H04B 7/155* (2006.01)

(52) U.S. Cl.
CPC ............ *H04W 76/14* (2018.02); *H04B 7/155* (2013.01)

(58) Field of Classification Search
CPC .......................... H04W 76/14; H04B 7/15507
See application file for complete search history.

(56) References Cited

U.S. PATENT DOCUMENTS

| | | | |
|---|---|---|---|
| 9,769,862 B2 * | 9/2017 | Sheng | H04W 76/14 |
| 2018/0324842 A1 * | 11/2018 | Gulati | H04W 76/14 |
| 2020/0178216 A1 * | 6/2020 | Huang | H04L 1/0003 |
| 2020/0245394 A1 * | 7/2020 | Wu | H04W 76/11 |
| 2020/0314612 A1 * | 10/2020 | Kang | H04W 4/40 |
| 2020/0344708 A1 * | 10/2020 | Liao | H04W 40/22 |
| 2020/0359428 A1 * | 11/2020 | Pan | H04W 28/0268 |
| 2021/0219105 A1 * | 7/2021 | Fan | H04W 4/40 |

FOREIGN PATENT DOCUMENTS

| | | | | |
|---|---|---|---|---|
| KR | 20210039918 A | * | 4/2021 | ......... H04W 72/042 |
| KR | 20210091021 A | * | 7/2021 | ............ H04W 8/24 |
| WO | WO-2018202797 A1 | * | 11/2018 | ....... H04W 36/0009 |

* cited by examiner

*Primary Examiner* — Chi H Pham
*Assistant Examiner* — Elisabeth Benoit Magloire
(74) *Attorney, Agent, or Firm* — Blue Capital Law Firm, P.C.

(57) ABSTRACT

A method and device are disclosed from the perspective of a User Equipment-to-User Equipment (UE-to-UE) Relay to forward sidelink UE capability information. In one embodiment, the method includes the UE-to-UE Relay receiving a first sidelink UE capability information from a first UE. The method further includes the UE-to-UE Relay transmitting the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information.

18 Claims, 17 Drawing Sheets

Legend:
- PC5-U: The SDAP/PDCP/RLC/MAC/PHY functionality is specified in TS 38.300.
- For PDCP SDU type "Non-IP", a "Non-IP Type" header included in the SDU by upper layer to indicate the type of non-IP messages carried will be specified in stage 3 specification.

Legend:
- PC5-S Protocol: The protocol used for the control plane signalling over the PC5 reference point for the secure layer-2 link as specified in clause 6.3.3.
- The PDCP/RLC/MAC/PHY functionality is specified in TS 38.300.

METHOD AND APPARATUS FOR FORWARDING SIDELINK USER EQUIPMENT (UE) CAPABILITY INFORMATION IN A WIRELESS COMMUNICATION SYSTEM

CROSS-REFERENCE TO RELATED APPLICATIONS

The present application claims the benefit of U.S. Provisional Patent Application Ser. No. 63/045,691 filed on Jun. 29, 2020, the entire disclosure of which is incorporated herein in its entirety by reference.

FIELD

This disclosure generally relates to wireless communication networks, and more particularly, to a method and apparatus for forwarding sidelink User Equipment (UE) capability information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a User Equipment-to-User Equipment (UE-to-UE) Relay to forward sidelink UE capability information. In one embodiment, the method includes the UE-to-UE Relay receiving a first sidelink UE capability information from a first UE. The method further includes the UE-to-UE Relay transmitting the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V16.2.0, "Architecture enhancements for 5G System (5GS) to support Vehicle-to-Everything (V2X) services (Release 16)"; TS 24.587 V16.0.0, "Vehicle-to-Everything (V2X) services in 5G System (5GS); Stage 3 (Release 16)"; TS 38.331 V16.0.0, "NR; Radio Resource Control (RRC) protocol specification (Release 16)"; R2-2005973, "Draft-CR for V2X UE capability (focusing on RAN2 capability)"; TR 23.752 V0.3.0, "Study on system enhancement for Proximity based services (ProSe) in the 5G System (5GS) (Release 17)". The standards and documents listed above are hereby expressly incorporated by reference in their entirety.

Figure 1:
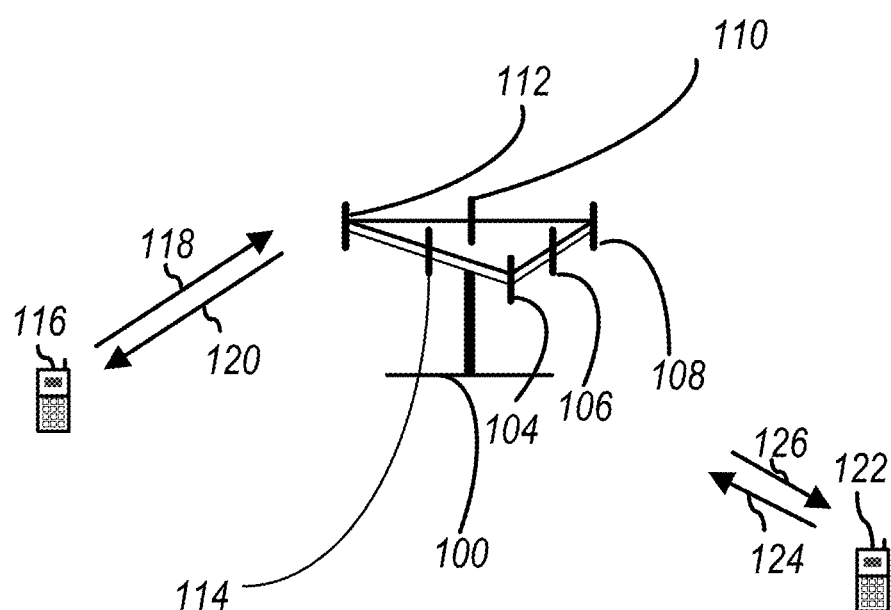
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
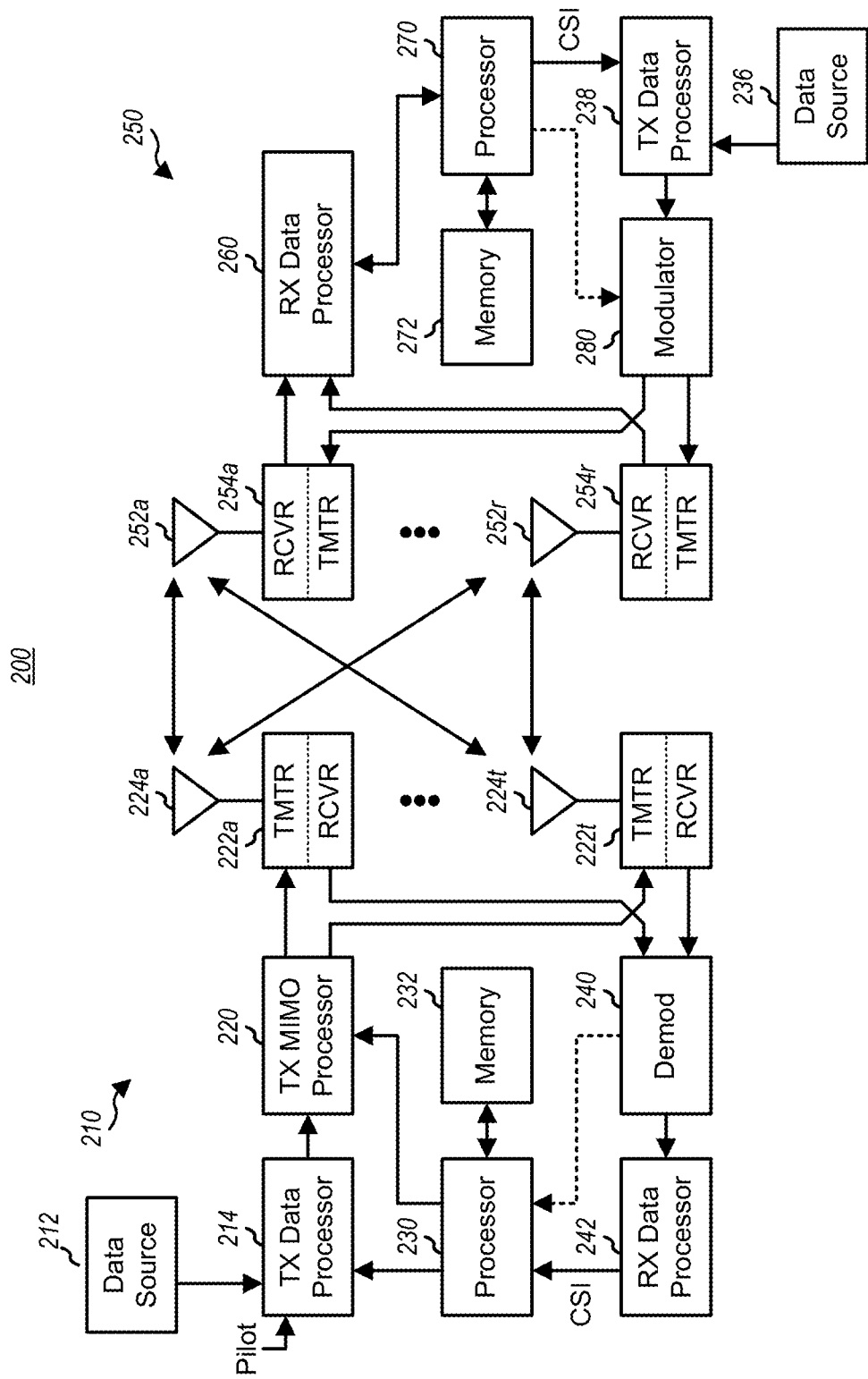
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
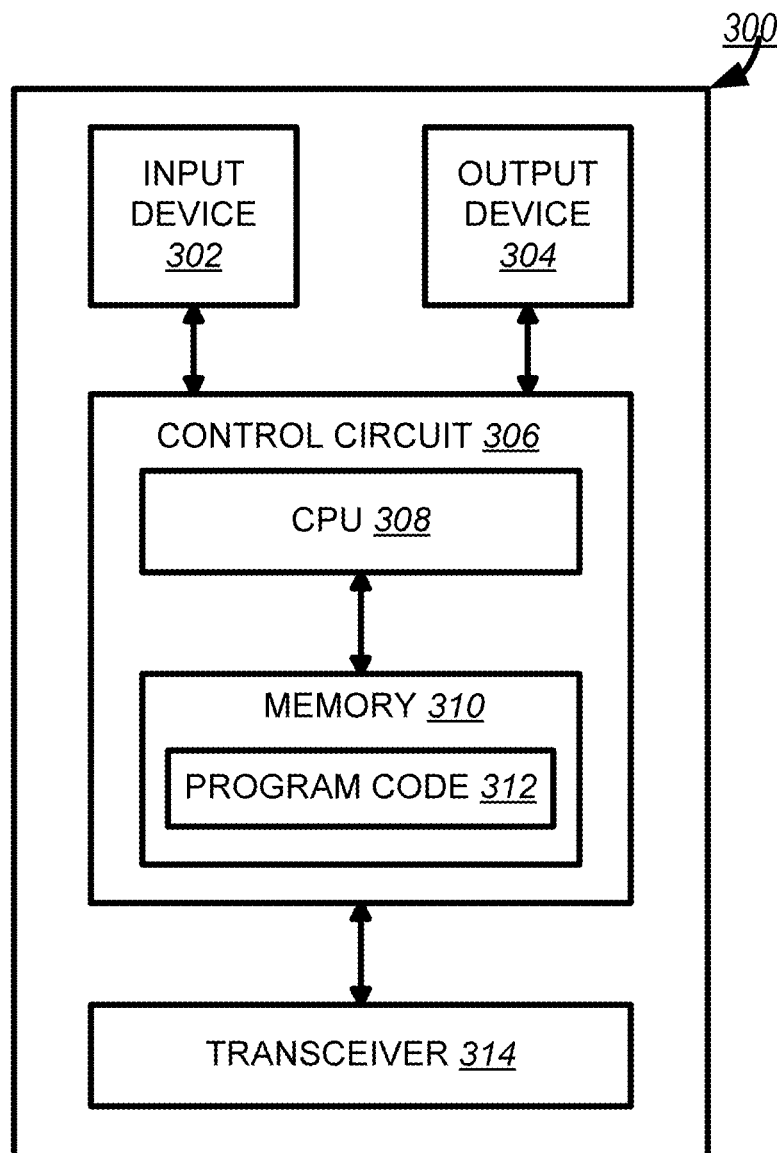
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
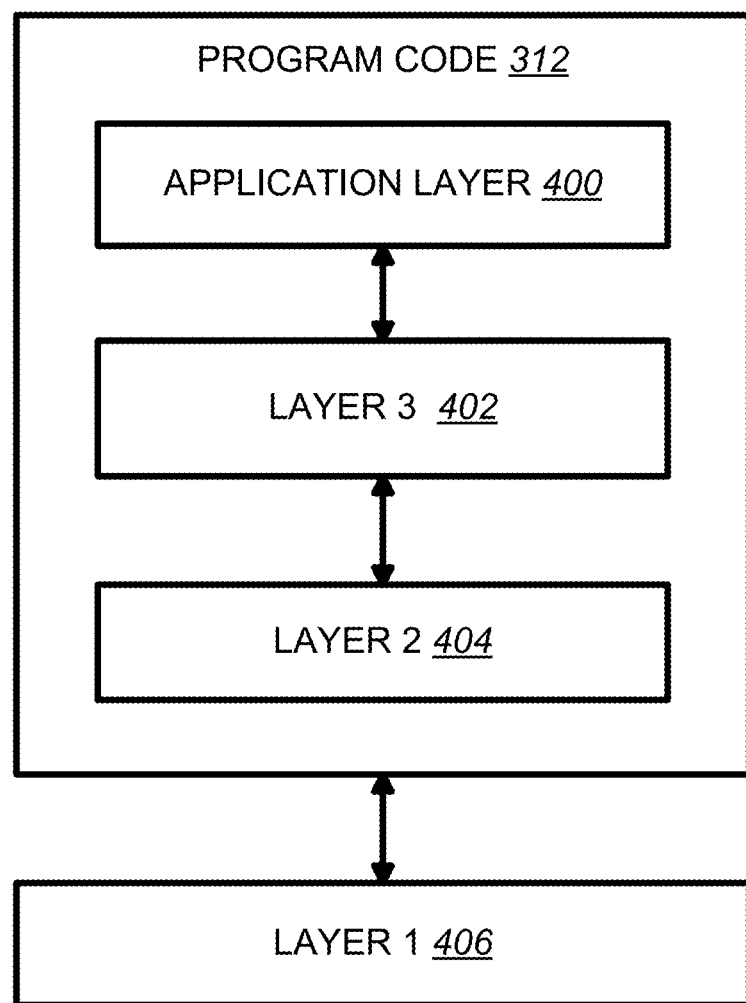
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies procedures related to unicast mode V2X communication over PC5 reference point as follows:

5.1.2 Authorization and Provisioning for V2X Communications Over PC5 Reference Point 5.1.2.1 Policy/Parameter Provisioning The following sets of information for V2X communications over PC5 reference point is provisioned to the UE:

1) Authorization policy:
   When the UE is "served by E-UTRA" or "served by NR":
      PLMNs in which the UE is authorized to perform V2X communications over PC5 reference point when "served by E-UTRA" or "served by NR".
      For each above PLMN:
         RAT(s) over which the UE is authorized to perform V2X communications over PC5 reference point.
   When the UE is "not served by E-UTRA" and "not served by NR":
      Indicates whether the UE is authorized to perform V2X communications over PC5 reference point when "not served by E-UTRA" and "not served by NR".
      RAT(s) over which the UE is authorized to perform V2X communications over PC5 reference point.
   NOTE 1: In this specification, {When the UE is "served by E-UTRA" or "served by NR"} and {When the UE is "not served by E-UTRA" and "not served by NR"} are relevant to V2X communications over PC5 reference point.

2) Radio parameters when the UE is "not served by E-UTRA" and "not served by NR":
   Includes the radio parameters per PC5 RAT (i.e. LTE PC5, NR PC5) with Geographical Area(s) and an indication of whether they are "operator managed" or "non-operator managed". These radio parameters (e.g., frequency bands) are defined in TS 36.331 [14] and TS 38.331 [15]. The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.
   NOTE 2: Whether a frequency band is "operator managed" or "non-operator managed" in a given Geographical Area is defined by local regulations.

3) Policy/parameters per RAT for PC5 Tx Profile selection:
   The mapping of V2X service types (e.g. PSIDs or ITS-AIDS) to Tx Profiles (see TS 36.300 [9] and TS 38.300 [11] for further information).

4) Policy/parameters related to privacy:
   The list of V2X service types, e.g. PSIDs or ITS-AIDS of the V2X applications, with Geographical Area(s) that require privacy support.
   A privacy timer value indicating the duration after which the UE shall change each source Layer-2 ID self-assigned by the UE when privacy is required.

5) Policy/parameters when LTE PC5 is selected:
   Same as specified in TS 23.285 [8] clause 4.4.1.1.2 item 3) Policy/parameters except for the mapping of V2X service types to Tx Profiles and the list of V2X services with Geographical Area(s) that require privacy support.

6) Policy/parameters when NR PC5 is selected:
   The mapping of V2X service types (e.g. PSIDs or ITS-AIDS) to V2X frequencies with Geographical Area(s).
   The mapping of Destination Layer-2 ID(s) and the V2X service types, e.g. PSIDs or ITS-AIDs of the V2X application for broadcast.
   The mapping of Destination Layer-2 ID(s) and the V2X service types, e.g. PSIDs or ITS-AIDs of the V2X application for groupcast.
   The mapping of default Destination Layer-2 ID(s) for initial signalling to establish unicast connection and the V2X service types, e.g. PSIDs or ITS-AIDS of the V2X application.
   NOTE 3: The same default Destination Layer-2 ID for unicast initial signalling can be mapped to more than one V2X service types. In the case where different V2X services are mapped to distinct default Destination Layer-2 IDs, when the UE intends to establish a single unicast link that can be used for more than one V2X service types, the UE can select any of the default Destination Layer-2 IDs to use for the initial signalling.
   PC5 QoS mapping configuration:
      Input from V2X application layer:
         V2X service type (e.g. PSID or ITS-AID).
         (Optional) V2X Application Requirements for the V2X service type, e.g. priority requirement, reliability requirement, delay requirement, range requirement.
      NOTE 4: Details of V2X Application Requirements for the V2X service type is up to implementation and out of scope of this specification.
      Output:
         PC5 QoS parameters defined in clause 5.4.2 (i.e. PQI and conditionally other parameters such as MFBR/GFBR, etc.).
         AS layer configurations (see TS 38.331 [15]), e.g. the mapping of PC5 QoS profile(s) to radio bearer(s), when the UE is "not served by E-UTRA" and "not served by NR".
         The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.

7) Validity timer indicating the expiration time of the V2X Policy/Parameter.

The above parameter sets from bullet 2) to 6) may be configured in the UE through the V1 reference point by the V2X Application Server.

[ . . . ]

5.2.1.4 Unicast Mode Communication Over PC5 Reference Point

Figure 5:
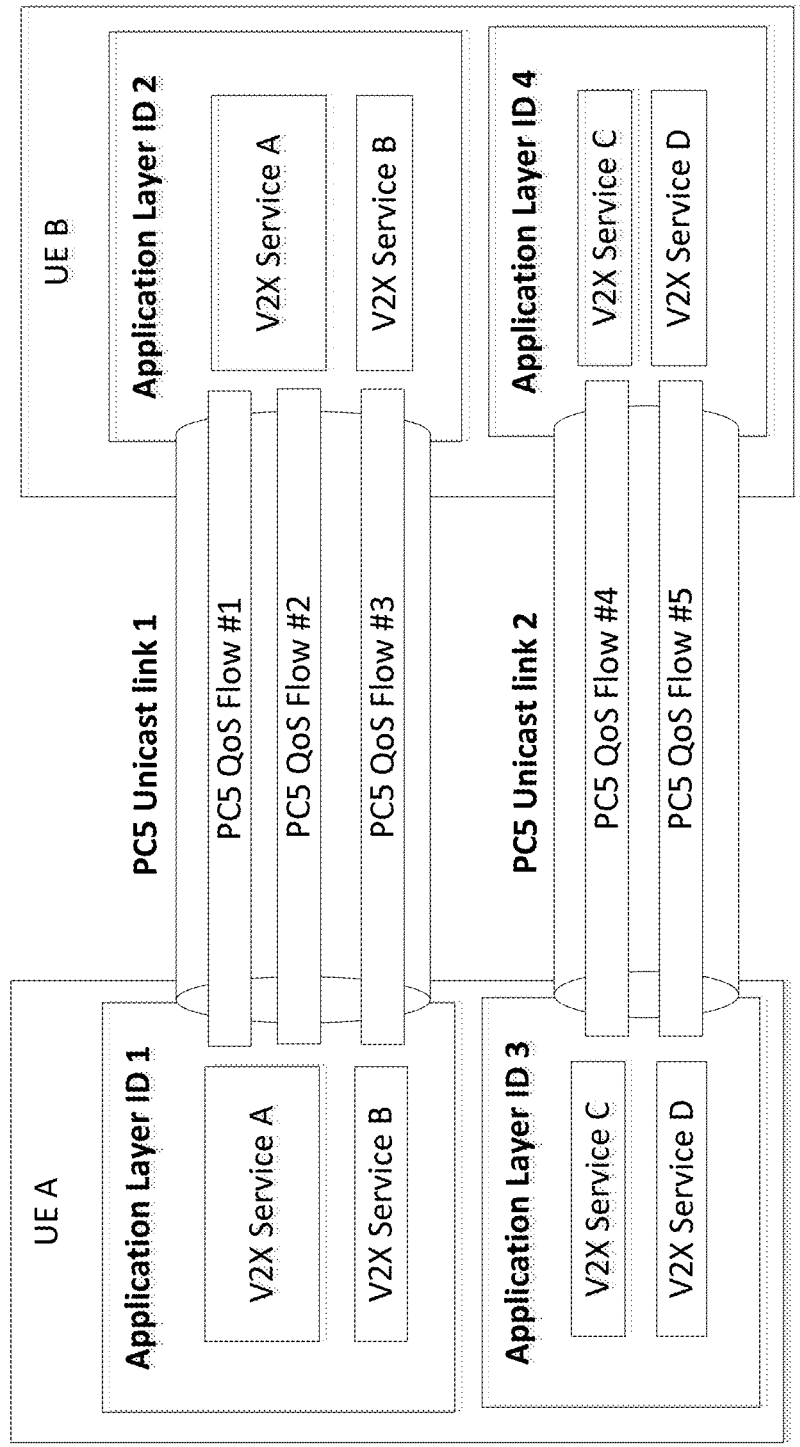
FIG. 5 is a reproduction of FIG. 5.2.1.4-1 of 3GPP TS 23.287 V16.2.0.

Unicast mode of communication is only supported over NR based PC5 reference point. FIG. 5.2.1.4-1 illustrates an example of PC5 unicast links.

FIG. 5.2.1.4-1 of 3GPP TS 23.287 V16.2.0, Entitled "Example of PC5 Unicast Links", is Reproduced as FIG. 5

The following principles apply when the V2X communication is carried over PC5 unicast link:
- A PC5 unicast link between two UEs allows V2X communication between one or more pairs of peer V2X services in these UEs. All V2X services in the UE using the same PC5 unicast link use the same Application Layer ID.
- NOTE 1: An Application Layer ID can change in time as described in clauses 5.6.1.1 and 6.3.3.2, due to privacy. This does not cause a re-establishment of a PC5 unicast link. The UE triggers a Link Identifier Update procedure as specified in clause 6.3.3.2.
- One PC5 unicast link supports one or more V2X service types (e.g. PSIDs or ITS-AIDS) if these V2X service types are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
- NOTE 2: A source UE is not required to know whether different target Application Layer IDs over different PC5 unicast links belong to the same target UE.
- A PC5 unicast link supports V2X communication using a single network layer protocol e.g. IP or non-IP.
- A PC5 unicast link supports per-flow QoS model as specified in clause 5.4.1.

When the Application layer in the UE initiates data transfer for a V2X service type which requires unicast mode of communication over PC5 reference point:
- the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise
- the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:
- V2X service type(s) (e.g. PSID(s) or ITS-AID(s)); and
- Application Layer ID and Layer-2 ID of UE A; and
- Application Layer ID and Layer-2 ID of UE B; and
- network layer protocol used on the PC5 unicast link; and
- for each V2X service type, a set of PC5 QoS Flow Identifier(s) (PFI(s)). Each PFI is associated with QoS parameters (i.e. PQI).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

V2X Service Info and QoS Info are carried in PC5-S signalling messages and exchanged between two UEs as specified in clause 6.3.3. Based on the exchanged information, PFI is used to identify V2X service. When the receiving UE receives V2X service data over the established PC5 unicast link, the receiving UE determines the appropriate V2X service based on the PFI to forward the received V2X service data to the upper layer.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

[ . . . ]

5.6.1.4 Identifiers for Unicast Mode V2X Communication Over PC5 Reference Point For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

Figure 6:
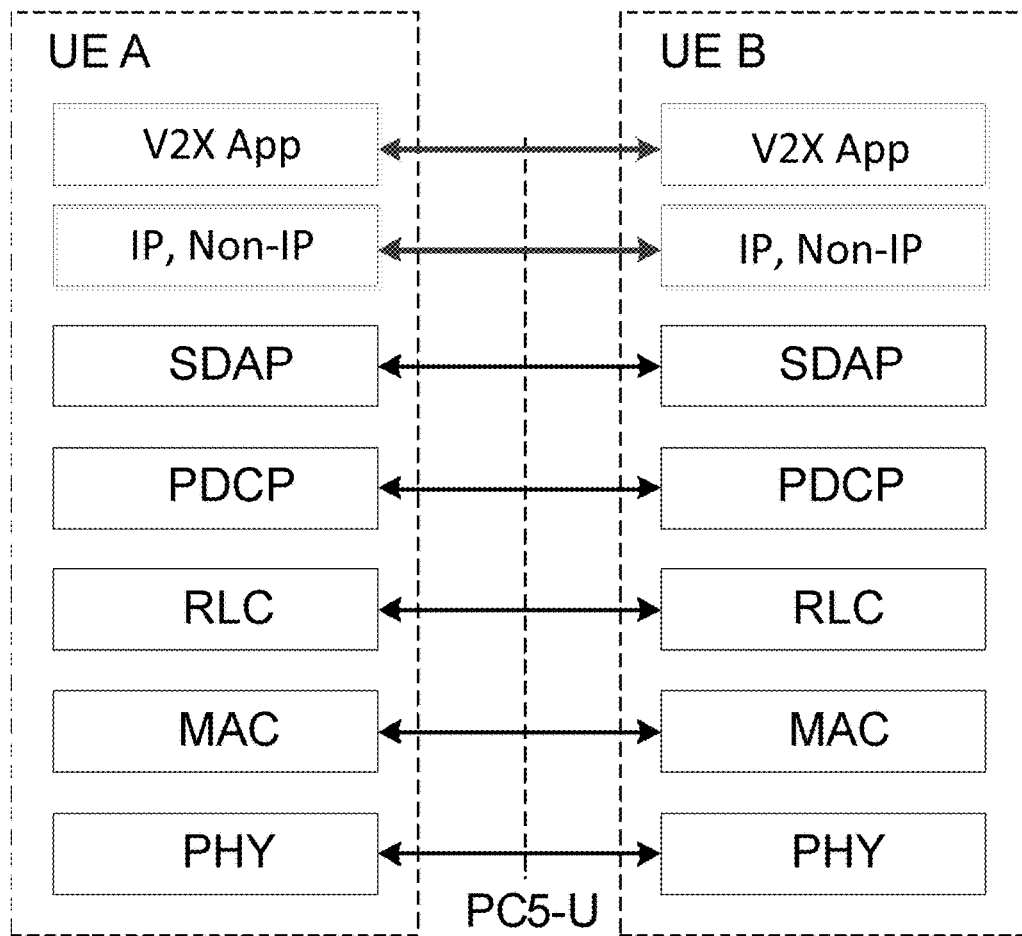
FIG. 6 is a reproduction of FIG. 6.1.1-1 of 3GPP TS 23.287 V16.2.0.

A UE may establish multiple PC5 unicast links with a peer UE and use the same or different source Layer-2 IDs for these PC5 unicast links.
[ . . . ]
6.1 Control and User Plane Stacks
6.1.1 User Plane for NR PC5 Reference Point Supporting V2X Services
FIG. 6.1.1-1 depicts a user plane for NR PC5 reference point, i.e. PC5 User Plane Protocol stack.

FIG. 6.1.1-1 of 3GPP TS 23.287 V16.2.0, Entitled "User Plane for NR PC5 Reference Point", is Reproduced as FIG. 6

IP and Non-IP PDCP SDU types are supported for the V2X communication over PC5 reference point.

For IP PDCP SDU type, only IPv6 is supported. The IP address allocation and configuration are as defined in clause 5.6.1.1.

The Non-IP PDCP SDU contains a Non-IP Type header, which indicates the V2X message family used by the application layer, e.g. IEEE 1609 family's WSMP [18], ISO defined FNTP [19].

NOTE: The Non-IP Type header and allowed values are defined in TS 24.587 [24].

The packets from V2X application layer are handled by the V2X layer before transmitting them to the AS layer, e.g. V2X layer maps the IP/Non IP packets to PC5 QoS Flow and marks the corresponding PFI.
6.1.2 Control Plane for NR PC5 Reference Point Supporting V2X Services
Editor's note: Whether PC5-S messages are carried in PC5 RRC signalling depends on RAN decision.
FIG. 6.1.2-1 depicts a control plane for NR PC5 reference point, i.e. PC5 Signalling Protocol stack.

Figure 7:
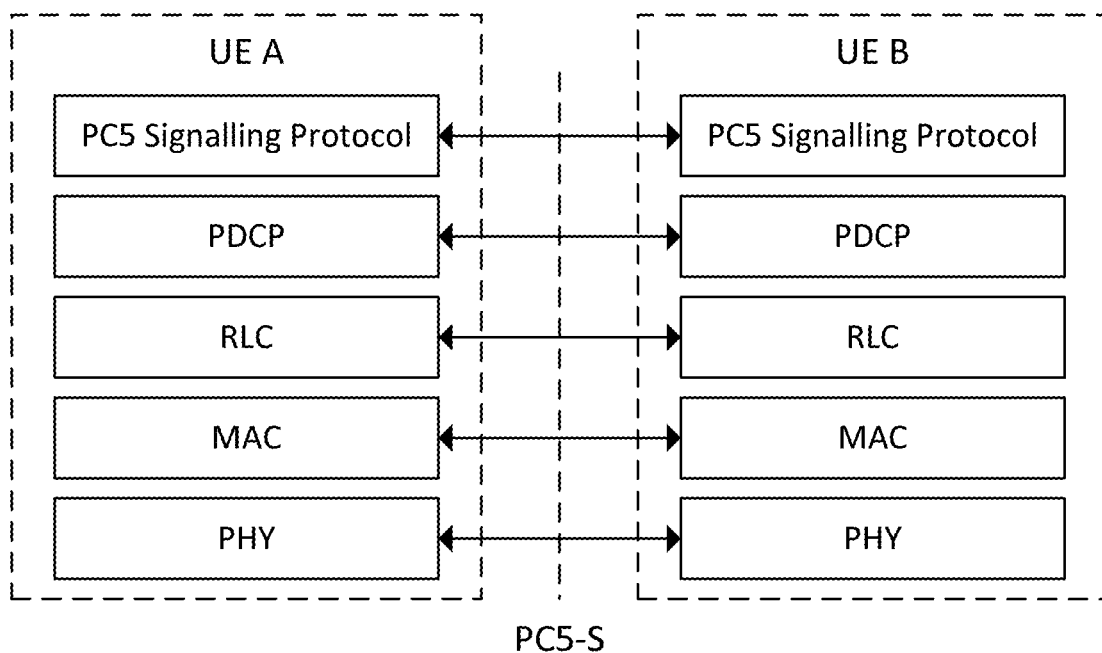
FIG. 7 is a reproduction of FIG. 6.1.2-1 of 3GPP TS 23.287 V16.2.0.

FIG. 6.1.2-1 of 3GPP TS 23.287 V16.2.0, Entitled "Control Plane for NR PC5 Reference Point", is Reproduced as FIG. 7

[ . . . ]
6.3.3 Unicast Mode V2X Communication Over PC5 Reference Point
6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 8:
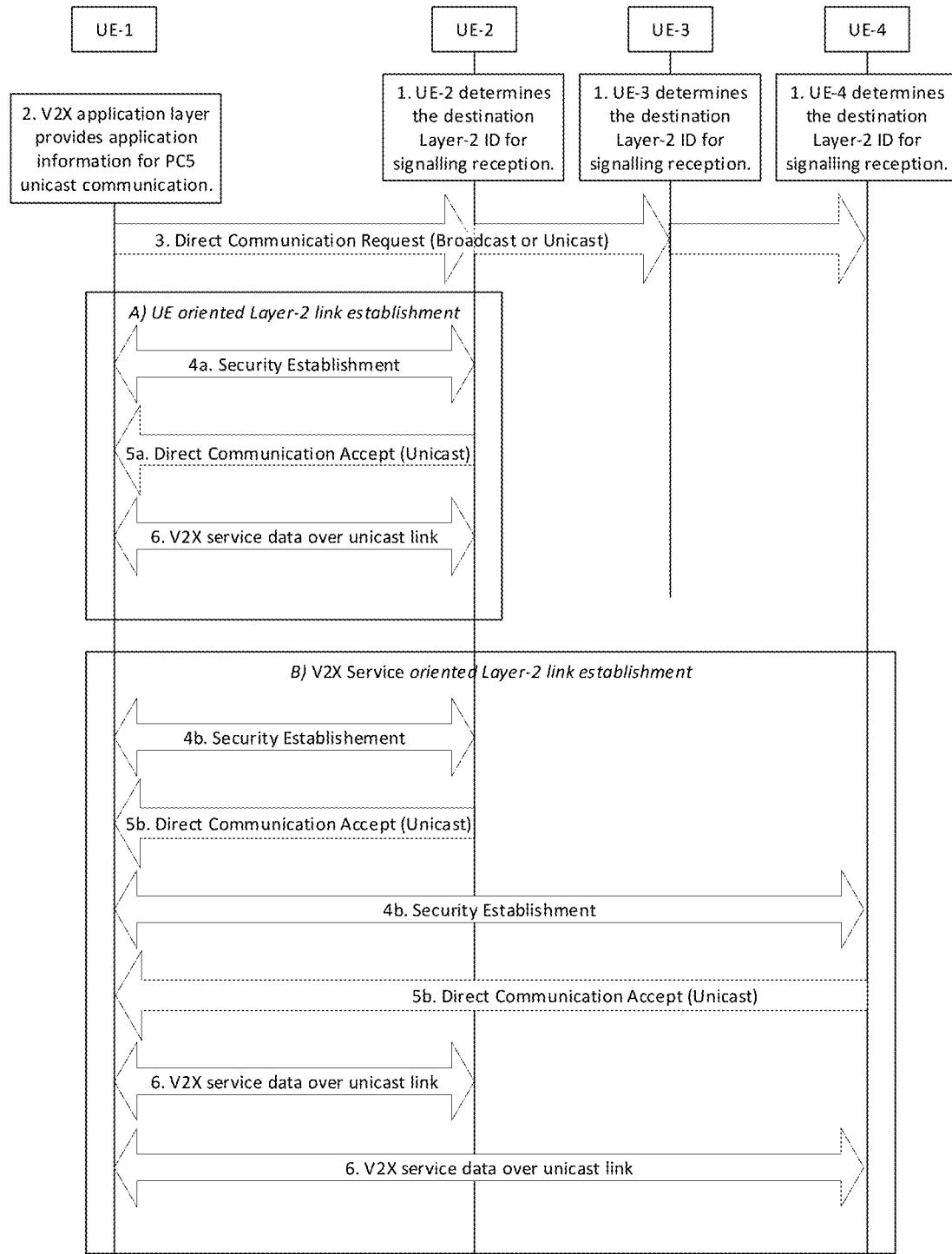
FIG. 8 is a reproduction of FIG. 6.3.3.1-1 of 3GPP TS 23.287 V16.2.0.

FIG. 6.3.3.1-1 of 3GPP TS 23.287 V16.2.0, Entitled "Layer-2 Link Establishment Procedure", is Reproduced as FIG. 8

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:
4a. If the Target User Info is included in the Direct Communication Request message, the target UE, i.e. UE-2, responds by establishing the security with UE-1.
4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) lithe Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:

IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

3GPP TS 24.587 specifies Stage 3 PC5 unicast link establishment procedure as follows:

6.1.2.2 PC5 Unicast Link Establishment Procedure 6.1.2.2.1 General

The PC5 unicast link establishment procedure is used to establish a PC5 unicast link between two UEs. The UE sending the request message is called the "initiating UE" and the other UE is called the "target UE".

Editor's note: The details about security procedure defined by SA3 are FFS.

Editor's note: The details of the IEs of the following messages are FFS.

6.1.2.2.2 PC5 Unicast Link Establishment Procedure Initiation by Initiating UE

Editor's note: This section needs to be revisited after SA3 have determined the full set of security requirements for unicast link establishment.

The initiating UE shall meet the following pre-conditions before initiating this procedure:

a) a request from upper layers to transmit the packet for V2X service over PC5;

b) the link layer identifier for the initiating UE (i.e. layer 2 ID used for unicast communication) is available (e.g. pre-configured or self-assigned);

c) the link layer identifier for the unicast initial signaling (i.e. destination layer 2 ID used for unicast initial signaling) is available to the initiating UE (e.g. pre-configured, obtained as specified in clause 5.2.3 or known via prior V2X communication);

d) the initiating UE is either authorised for V2X communication over PC5 in NR in the serving PLMN, or has a valid authorization for V2X communication over PC5 in NR when not served by E-UTRAN and not served by NR; and e) there is no existing PC5 unicast link for the pair of peer application layer IDs and the network layer protocol of this PC5 unicast link are identical to those required by the upper layer in the initiating UE for this V2X service.

In order to initiate the PC5 unicast link establishment procedure, the initiating UE shall create a DIRECT LINK ESTABLISHMENT REQUEST message. The initiating UE:

a) shall include the source user info set to the initiating UE's application layer ID received from upper layers;

b) shall include the V2X service identifier received from upper layer;

c) may include the target user info set to the target UE's application layer ID if received from upper layers; and d) shall include the security establishment information.

Editor's note: The parameters in the security establishment information will be defined by SA3.

After the DIRECT LINK ESTABLISHMENT REQUEST message is generated, the initiating UE shall pass this message to the lower layers for transmission along with the initiating UE's Layer 2 ID for unicast communication and the destination layer 2 ID used for unicast initial signaling, and start timer T5000. The UE shall not send a new DIRECT LINK ESTABLISHMENT REQUEST message to the same target UE identified by the same application layer ID while timer T5000 is running.

Figure 9:
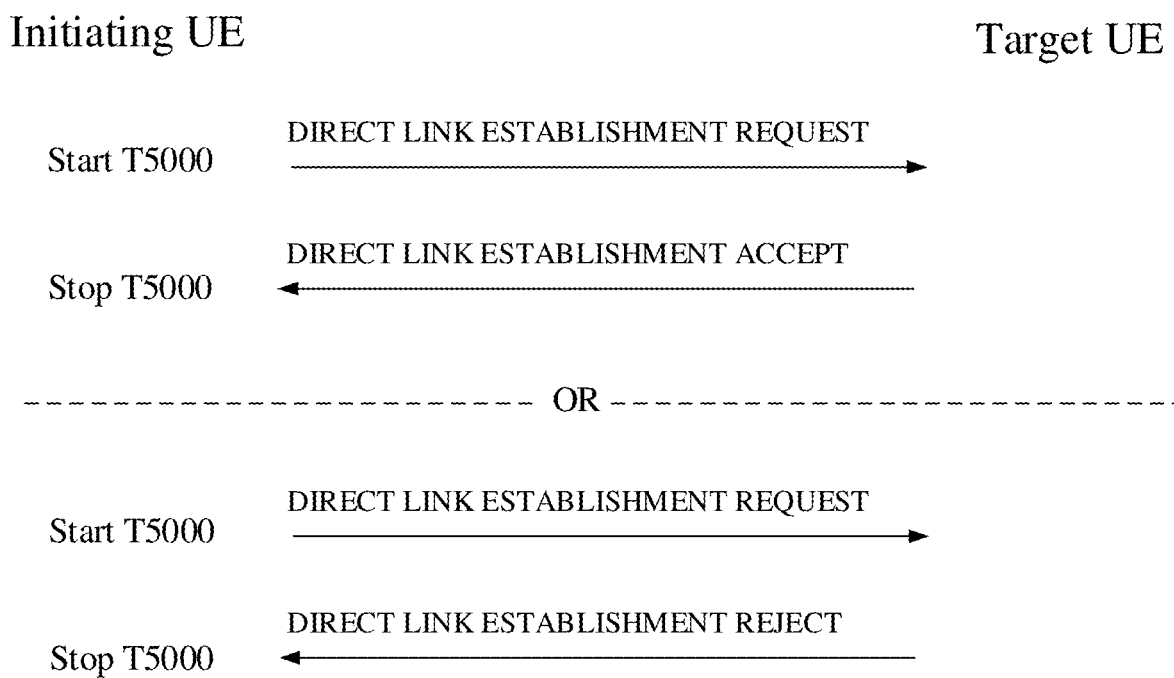
FIG. 9 is a reproduction of FIG. 6.1.2.2.2 of 3GPP TS 24.587 V16.0.0.

FIG. 6.1.2.2.2 of 3GPP TS 24.587 V16.0.0, Entitled "PC5 Unicast Link Establishment Procedure", is Reproduced as FIG. 9

6.1.2.2.3 PC5 Unicast Link Establishment Procedure Accepted by the Target UE

Upon receipt of a DIRECT LINK ESTABLISHMENT REQUEST message, the target UE shall assign a layer-2 ID for this PC5 unicast link and store this assigned layer-2 ID and the source layer 2 ID used in the transport of this message provided by the lower layers. This pair of layer-2 IDs is associated with a PC5 unicast link context.

If:

a) the target user info IE is included in the DIRECT LINK ESTABLISHMENT REQUEST message and this IE includes the target UE's application layer ID; or b) the target user info IE is not included in the DIRECT LINK ESTABLISHMENT REQUEST message and the target UE is interested in the V2X service identified by the V2X service identifier in the DIRECT LINK ESTABLISHMENT REQUEST message;

then the target UE shall either identify an existing security context with the initiating UE, or establish a new security context by performing one or more PC5 unicast link authentication procedures as specified in clause 6.1.2.6, and performing the PC5 unicast link security mode control procedure as specified in clause 6.1.2.7.

Upon successful completion of the PC5 unicast link security mode control procedure, in order to determine whether the DIRECT LINK ESTABLISHMENT REQUEST message can be accepted or not, in case of IP communication, the target UE checks whether there is at least one common IP address configuration option supported by both the initiating UE and the target UE.

If the target UE accepts the PC5 unicast link establishment procedure, the target UE shall create a DIRECT LINK ESTABLISHMENT ACCEPT message. The target UE:

a) shall include the source user info set to the target UE's application layer ID received from upper layers;

b) shall include a PQFI and the corresponding PC5 QoS parameters;

c) may include an IP address configuration IE set to one of the following values if IP communication is used:

1) "IPv6 router" if only IPv6 address allocation mechanism is supported by the target UE, i.e. acting as an IPv6 router; or 2) "IPv6 address allocation not supported" if IPv6 address allocation mechanism is not supported by the target UE;

d) may include a link local IPv6 address IE formed locally based on IETF RFC 4862 [16] if IP address configuration IE is set to "IPv6 address allocation not supported" and the received DIRECT LINK ESTABLISHMENT REQUEST message included a link local IPv6 address IE.

6.1.2.2.4 PC5 Unicast Link Establishment Procedure Completion by the Initiating UE Upon receipt of the DIRECT LINK ESTABLISHMENT ACCEPT message, the initiating UE shall stop timer T5000 and store the source layer-2 ID and the destination Layer-2 ID used in the transport of this message provided by the lower layers. This pair of layer-2 IDs shall be associated with a PC5 unicast link context. From this time onward the initiating UE shall use the established link for V2X communication over PC5 and additional PC5 signalling messages to the target UE.

6.1.2.2.5 PC5 Unicast Link Establishment Procedure not Accepted by the Target UE If the DIRECT LINK ESTABLISHMENT REQUEST message cannot be accepted, the target UE shall send a DIRECT LINK ESTABLISHMENT REJECT message. The DIRECT LINK ESTABLISHMENT REJECT message contains a PC5 signalling protocol cause IE set to one of the following cause values:

1 direct communication to the target UE not allowed;

3 conflict of Layer 2 ID for unicast communication is detected;

5 lack of resources for proposed link; or

111 protocol error, unspecified.

If the target UE is not allowed to accept this request .e.g. based on operator policy or service authorisation provisioning, the target UE shall send a DIRECT LINK ESTABLISHMENT REJECT message containing PC5 signalling protocol cause value #1 "direct communication to the target UE not allowed".

For a received DIRECT LINK ESTABLISHMENT REQUEST message from a Layer 2 ID (for unicast communication), if the target UE already has an existing link established to the UE known to use this Layer 2 ID or is currently processing a DIRECT LINK ESTABLISHMENT REQUEST message from the same Layer 2 ID, but with user info different from the user info IE included in this new incoming message, the target UE shall send a DIRECT LINK ESTABLISHMENT REJECT message containing PC5 signalling protocol cause value #3 "conflict of Layer 2 ID for unicast communication is detected".

If the PC5 unicast link establishment fails due to the congestion problems or other temporary lower layer problems causing resource constraints, the target UE shall send a DIRECT LINK ESTABLISHMENT REJECT message containing PC5 signalling protocol cause value #5 "lack of resources for proposed link".

For other reasons that causing the failure of link establishment, the target UE shall send a DIRECT LINK ESTAB- LISHMENT REJECT message containing PC5 signalling protocol cause value #111 "protocol error, unspecified".

Upon receipt of the DIRECT LINK ESTABLISHMENT REJECT message, the initiating UE shall stop timer T5000 and abort the PC5 unicast link establishment procedure. If the PC5 signalling protocol cause value in the DIRECT LINK ESTABLISHMENT REJECT message is #1 "direct communication to the target UE not allowed" or #5 "lack of resources for proposed link", then the UE shall not attempt to start PC5 unicast link establishment with the same target UE at least for a time period T.

NOTE: The length of time period T is UE implementation specific and can be different for the case when the UE receives PC5 signalling protocol cause value #1 "direct communication to the target UE not allowed" or when the UE receives PC5 signalling protocol cause value #5 "lack of resources for proposed link".

6.1.2.2.6 Abnormal Cases
6.1.2.2.6.1 Abnormal Cases at the Initiating UE

If timer T5000 expires, the initiating UE shall retransmit the DIRECT LINK ESTABLISHMENT REQUEST message and restart timer T5000. After reaching the maximum number of allowed retransmissions, the initiating UE shall abort the PC5 unicast link establishment procedure and may notify the upper layer that the target UE is unreachable.

NOTE: The maximum number of allowed retransmissions is UE implementation specific.

If the need to establish a link no longer exists before the procedure is completed, the initiating UE shall abort the procedure.

6.1.2.2.6.2 Abnormal Cases at the Target UE

For a received DIRECT LINK ESTABLISHMENT REQUEST message from a source Layer 2 ID (for unicast communication), if the target UE already has an existing link established to the UE known to use this source Layer 2 ID and the new request contains an identical source user info as the known user, the UE shall process the new request. However, the target UE shall only delete the existing link context after the new link establishment procedure succeeds.

3GPP TS 38.331 specifies Radio Resource Control (RRC) reconfiguration, UE capability information, sidelink UE information, and sidelink Data Radio Bearer (DRB) establishment as follows:

5.3.5 RRC Reconfiguration
[ . . . ]
5.3.5.3 Reception of an RRCReconfiguration by the UE The UE shall perform the following actions upon reception of the RRCReconfiguration, or upon execution of the conditional configuration (CHO or CPC):
[ . . . ]
1> if the RRCReconfiguration message includes the sl-ConfigDedicatedNR:
2> perform the sidelink dedicated configuration procedure as specified in 5.3.5.8;
[ . . . ]
5.3.5.14 Sidelink Dedicated Configuration The UE shall:
1> if sl-FreqInfoToAddModList is included in sl-ConfigDedicatedNR within RRCReconfiguration:
2> if configured to receive NR sidelink communication:
3> use the resource pool indicated by sl-RxPool for NR sidelink communication reception, as specified in 5.8.7;
2> if configured to transmit NR sidelink communication:
3> use the resource pool(s) indicated by sl-TxPoolSelectedNormal, sl-TxPoolScheduling or sl-TxPoolExceptional for NR sidelink communication transmission, as specified in 5.8.8;
2> perform CBR measurement on the transmission resource pools by sl-TxPoolSelectedNormal, sl-TxPoolScheduling or sl-TxPoolExceptional for NR sidelink communication transmission, as specified in 5.5.3.1;
2> use the synchronization configuration parameters for NR sidelink communication on frequencies included in sl-FreqInfoToAddModList, as specified in 5.8.5;
1> if sl-FreqInfoToReleaseList is included in sl-ConfigDedicatedNR within RRCReconfiguration:
2> for each entry included in the received sl-FreqInfoToReleaseList that is part of the current UE configuration:
3> release the related configurations from the stored NR sidelink communication configurations;
1> if sl-RodioBearerToReleaseList is included in sl-ConfigDedicatedNR within RRCReconfiguration:
2> perform sidelink DRB release as specified in 5.8.9.1.4;
1> if sl-RadioBearerToAddModList is included in sl-ConfigDedicatedNR within RRCReconfiguration:
2> perform sidelink DRB addition/modification as specified in 5.8.9.1.5;
1> if sl-ScheduledConfig is included in sl-ConfigDedicatedNR within RRCReconfiguration:
2> configure the MAC entity parameters, which are to be used for NR sidelink communication, in accordance with the received sl-ScheduledConfig;
1> if sl-UE-SelectedConfig is included in sl-ConfigDedicatedNR within RRCReconfiguration:
2> configure the parameters, which are to be used for NR sidelink communication, in accordance with the received sl-UE-SelectedConfig;
1> if sl-MeasConfigInfoToReleaseList is included in sl-ConfigDedicatedNR within RRCReconfiguration:
2> for each entry included in the received sl-MeasConfigInfoToReleaseList that is part of the current UE configuration:
3> release the related configurations from the stored NR sidelink measurement configuration information;
1> if sl-MeasConfigInfoToAddModList is included in sl-ConfigDedicatedNR within RRCReconfiguration:
2> for each entry included in the received sl-MeasConfigInfoToAddModList that is part of the current stored NR sidelink measurement configuration:
3> update the stored NR sidelink measurement configuration information;
2> for each entry included in the received sl-MeasConfigInfoToAddModList that is not part of the current stored NR sidelink measurement configuration:
3> store the NR sidelink measurement configuration.
[ . . . ]
5.6.1 UE Capability Transfer
5.6.1.1 General This clause describes how the UE compiles and transfers its UE capability information upon receiving a UECapabilityEnquiry from the network.

Figure 10:
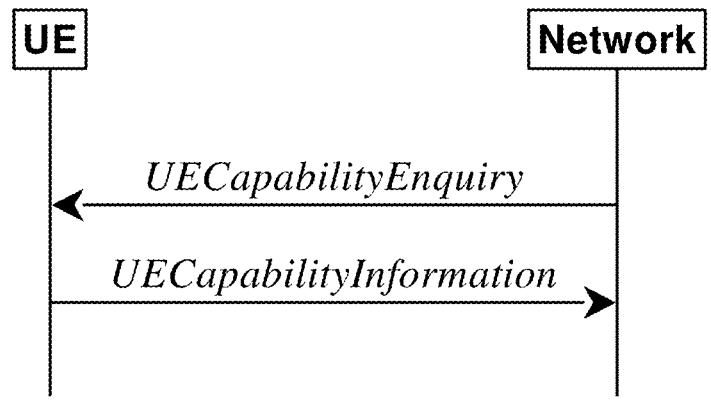
FIG. 10 is a reproduction of FIG. 5.6.1.1-1 of 3GPP TS 38.331 V16.0.0.

FIG. 5.6.1.1-1 of 3GPP TS 38.331 V16.0.0, Entitled "UE Capability Transfer", is Reproduced as FIG. 10

5.6.1.2 Initiation

The network initiates the procedure to a UE in RRC_CONNECTED when it needs (additional) UE radio access capability information. The network should retrieve UE capabilities only after AS security activation. Network does not forward UE capabilities that were retrieved before AS security activation to the CN.

5.6.1.3 Reception of the UECapabilityEnquiry by the UE

The UE shall set the contents of UECapabilityInformation message as follows:

1> if the ue-CapabilityRAT-RequestList contains a UE-CapabilityRAT-Request with rat-Type set to nr:
  2> include in the ue-CapabilityRAT-ContainerList a UE-CapabilityRAT-Container of the type UE-NR-Capability and with the rat-Type set to nr;
  2> include the sup portedBandCombinationList, featuresets and featuresetCombinations as specified in clause 5.6.1.4;
1> if the ue-CapabilityRAT-RequestList contains a UE-CapabilityRAT-Request with rat-Type set to eutra-nr:
  2> if the UE supports (NG)EN-DC or NE-DC:
    3> include in the ue-CapabilityRAT-ContainerList a UE-CapabilityRAT-Container of the type UE-MRDC-Capability and with the rat-Type set to eutra-nr;
    3> include the sup portedBandCombinationList and featureSetCombinations as specified in clause 5.6.1.4;
1> if the ue-CapabilityRAT-RequestList contains a UE-CapabilityRAT-Request with rat-Type set to eutra:
  2> if the UE supports E-UTRA:
    3> include in the ue-CapabilityRAT-ContainerList a ue-CapabilityRAT-Container of the type UE-EUTRA-Capability and with the rat-Type set to eutra as specified in TS 36.331 [10], clause 5.6.3.3, according to the capabilityRequestFilter, if received;
1> if the ue-CapabilityRAT-RequestList contains a UE-CapabilityRAT-Request with rat-Type set to utra-fdd:
  2> if the UE supports UTRA-FDD:
    3> include the UE radio access capabilities for UTRA-FDD within a ue-CapabilityRAT-Container and with the rat-Type set to utra-fdd;
1> if the RRC message segmentation is enabled based on the field rrc-SegAllowed received, and the encoded RRC message is larger than the maximum supported size of a PDCP SDU specified in TS 38.323 [5]:
  2> initiate the UL message segment transfer procedure as specified in clause 5.7.7;
1> else:
  2> submit the UECapabilityInformation message to lower layers for transmission, upon which the procedure ends.

[ ... ]

5.8.3 Sidelink UE Information for NR Sidelink Communication 5.8.3.1 General

Figure 11:
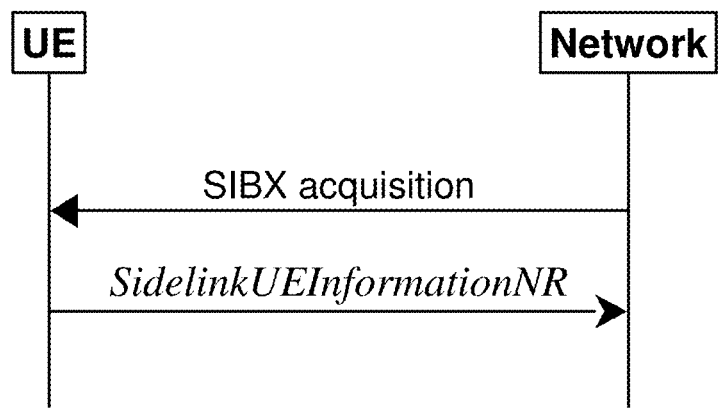
FIG. 11 is a reproduction of FIG. 5.8.3.1-1 of 3GPP TS 38.331 V16.0.0.

FIG. 5.8.3.1-1 of 3GPP TS 38.331 V16.0.0, Entitled "Sidelink UE Information for NR Sidelink Communication", is Reproduced as FIG. 11

The purpose of this procedure is to inform the network that the UE is interested or no longer interested to receive NR sidelink communication, as well as to request assignment or release of transmission resource for NR sidelink communication and to report parameters related to NR sidelink communication.

5.8.3.2 Initiation

A UE capable of NR sidelink communication that is in RRC_CONNECTED may initiate the procedure to indicate it is (interested in) receiving NR sidelink communication in several cases including upon successful connection establishment or resuming, upon change of interest, or upon change to a PCell providing SIB12 including sl-ConfigCommonNR. A UE capable of NR sidelink communication may initiate the procedure to request assignment of dedicated resources for NR sidelink communication transmission.

Upon initiating this procedure, the UE shall:

1> if SIB12 including sl-ConfigCommonNR is provided by the PCell:
  2> ensure having a valid version of SIB12 for the PCell;
  2> if configured by upper layers to receive NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
      4> initiate transmission of the SidelinkUEInformationNR message to indicate the NR sidelink communication reception frequency of interest in accordance with 5.8.3.3;
  2> else:
    3> if the last transmission of the SidelinkUEInformationNR message included sl-RxInterestedFreqList:
      4> initiate transmission of the SidelinkUEInformationNR message to indicate it is no longer interested in NR sidelink communication reception in accordance with 5.8.3.3;
  2> if configured by upper layers to transmit NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-TxResourceReqList; or if the information carried by the sl-TxResourceReqList has changed since the last transmission of the SidelinkUEInformationNR message:
      4> initiate transmission of the SidelinkUEInformationNR message to indicate the NR sidelink communication transmission resources required by the UE in accordance with 5.8.3.3;

2> else:
   3> if the last transmission of the SidelinkUEInformationNR message included sl-TxResourceReqList:
      4> initiate transmission of the SidelinkUEInformationNR message to indicate it no longer requires NR sidelink communication transmission resources in accordance with 5.8.3.3.

5.8.3.3 Actions Related to Transmission of SidelinkUEInformationNR Message

The UE shall set the contents of the SidelinkUEInformationNR message as follows:
1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
   2> if SIB12 including sl-ConfigCommonNR is provided by the PCell:
      3> if configured by upper layers to receive NR sidelink communication:
         4> include sl-RxInterestedFreqList and set it to the frequency for NR sidelink communication reception;
      3> if configured by upper layers to transmit NR sidelink communication:
         4> include sl-TxResourceReqList and set its fields (if needed) as follows for each destination for which it requests network to assign NR sidelink communication resource:
            5> set sl-DestinationIdentiy to the destination identity configured by upper layer for NR sidelink communication transmission;
            5> set sl-CastType to the cast type of the associated destination identity configured by the upper layer for the NR sidelink communication transmission;
            5> set sl-RLC-ModeIndication to include the RLC mode(s) and optionally QoS profile(s) of the sidelink QoS flow(s) of the associated RLC mode(s), if the associated bi-directional sidelink DRB has been established due to the configuration by RRCReconfigurationSidelink;
            5> set sl-Failure as rlf for the associated destination for the NR sidelink communication transmission, if the sidelink RLF is detected;
            5> set sl-Failure as configFailure for the associated destination for the NR sidelink communication transmission, if RRCReconfigurationFailureSidelink is received as sidelink RRC reconfiguration failure;
            5> set sl-QoS-InfoList to include QoS profile(s) of the sidelink QoS flow(s) of the associated destination configured by the upper layer for the NR sidelink communication transmission;
            5> set sl-InterestedFreqList to indicate the frequency for NR sidelink communication transmission;
            5> set sl-TypeTxSyncList to the current synchronization reference type used on the associated sl-InterestedFreqUst for NR sidelink communication transmission.
1> The UE shall submit the SidelinkUEInformationNR message to lower layers for transmission. [ . . . ]

5.8.9.1.5 Sidelink DRB Addition/Modification

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

5.8.9.1.5.1 Sidelink DRB Addition/Modification Conditions

For NR sidelink communication, a sidelink DRB addition is initiated only in the following cases:
1> if any sidelink QoS flow is (re)configured by sl-ConfigDedicatedNR, SIB12, SidelinkPreconfigNR and is to be mapped to one sidelink DRB, which is not established; or
1> if any sidelink QoS flow is (re)configured by RRCReconfigurationSidelink and is to be mapped to a sidelink DRB, which is not established;

For NR sidelink communication, a sidelink DRB modification is initiated only in the following cases:
1> if any of the sidelink DRB related parameters is changed by sl-ConfigDedicatedNR, SIB12, SidelinkPreconfigNR or RRCReconfigurationSidelink for one sidelink DRB, which is established;

5.8.9.1.5.2 Sidelink DRB Addition/Modification Operations

For the sidelink DRB, whose sidelink DRB addition conditions are met as in sub-clause 5.8.9.1.5.1, the UE capable of NR sidelink communication that is configured by upper layers to perform NR sidelink communication shall:
1> for groupcast and broadcast, or
1> for unicast, after receiving RRCReconfigurationSidelink message (in case the addition is due to the configuration by RRCReconfigurationSidelink), or after receiving the RRCReconfigurationCompleteSidelink message (in case the addition is due to the configuration by sl-ConfigDedicatedNR, SIB12, SidelinkPreconfigNR or indicated by upper layers):
   2> if an SDAP entity for NR sidelink communication associated with the destination and the cast type of the sidelink DRB does not exist:
      3> establish an SDAP entity for NR sidelink communication as specified in TS 37.324 [24] clause 5.1.1;
      3> configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
   2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;
   2> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;

2> if the RRCReconfigurationSidelink is received:
   3> configure the MAC entity with a logical channel in accordance with the sl-MAC-LogicalChannel-ConfigPC5 received in the RRCReconfigurationSidelink associated with the sidelink DRB, and perform the sidelink UE information procedure in sub-clause 5.8.3 for unicast if need;
2> else:
   3> configure the MAC entity with a logical channel associated with the sidelink DRB, by assigning a new logical channel identity, in accordance with the sl-MAC-LogicalChannelConfig received in the sl-ConfigDedicatedNR, SIB12, SidelinkPreconfigNR.

NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in sub-clause 5.8.9.1.5.1, the UE capable of NR sidelink communication that is configured by upper layers to perform NR sidelink communication shall:
1> for groupcast and broadcast, or
1> for unicast, after receiving RRCReconfigurationSidelink message (in case the modification is due to the configuration by RRCReconfigurationSidelink), or after receiving the RRCReconfigurationCompleteSidelink message (in case the modification is due to the configuration by sl-ConfigDedicatedNR, SIB12 or SidelinkPreconfigNR):
   2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
   2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
   2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
   2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.

3GPP R2-2005973 is a change request (CR) to 3GPP TS38.331 [3]. This CR adds sidelink UE capability information (i.e. SidelinkParameters) in IE UE-NR-Capability in a UECapabilityInformation message reported by a UE to gNB, introduces sidelink UE capability transfer procedure between a UE and the peer UE, and also includes the UECapabilityInformationSidelink message received from the peer UE in a SidelinkUEinformationNR message reported to gNB as follows:

5.8.3 Sidelink UE Information for NR Sidelink Communication
5.8.3.1 General

Figure 12:
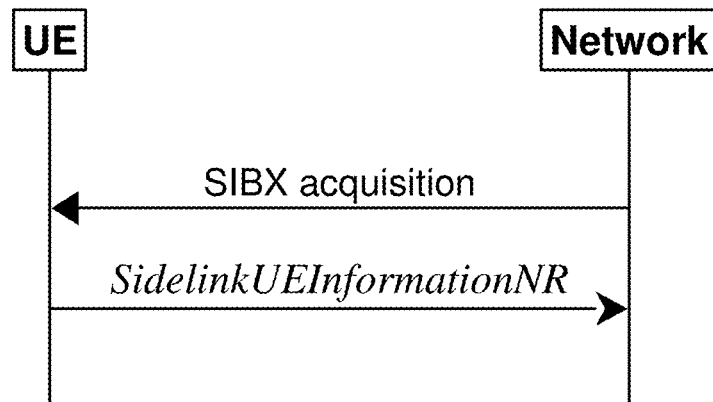
FIG. 12 is a reproduction of FIG. 5.8.3.1-1 of 3GPP R2-2005973.

FIG. 5.8.3.1-1 of 3GPP R2-2005973, Entitled "Sidelink UE Information for NR Sidelink Communication", is Reproduced as FIG. 12

The purpose of this procedure is to inform the network that the UE is interested or no longer interested to receive NR sidelink communication, as well as to request assignment or release of transmission resource for NR sidelink communication and to report parameters related to NR sidelink communication.

5.8.3.2 Initiation

A UE capable of NR sidelink communication that is in RRC_CONNECTED may initiate the procedure to indicate it is (interested in) receiving NR sidelink communication in several cases including upon successful connection establishment or resuming, upon change of interest, or upon change to a PCell providing SIB12 including sl-ConfigCommonNR. A UE capable of NR sidelink communication may initiate the procedure to request assignment of dedicated resources for NR sidelink communication transmission.

Upon initiating this procedure, the UE shall:
1> if SIB12 including sl-ConfigCommonNR is provided by the PCell:
   2> ensure having a valid version of SIB12 for the PCell;
   2> if configured by upper layers to receive NR sidelink communication on the frequency included in sl-FreqInfoList in SIB12 of the PCell:
     3> if the UE did not transmit a SidelinkUEInformationNR message since last entering RRC_CONNECTED state; or
     3> if since the last time the UE transmitted a SidelinkUEInformationNR message the UE connected to a PCell not providing SIB12 including sl-ConfigCommonNR; or
     3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
        4> initiate transmission of the SidelinkUEInformationNR message to indicate the NR sidelink communication reception frequency of interest in accordance with 5.8.3.3;
   2> else:
     3> if the last transmission of the SidelinkUEInformationNR message included sl-RxInterestedFreqList:
        4> initiate transmission of the SidelinkUEInformationNR message to indicate it is no longer interested in NR sidelink communication reception in accordance with 5.8.3.3;
   2> if configured by upper layers to transmit NR sidelink communication on the frequency included in sl-FreqInfoList in SIB12 of the PCell:
     3> if the UE did not transmit a SidelinkUEInformationNR message since last entering RRC_CONNECTED state; or
     3> if since the last time the UE transmitted a SidelinkUEInformationNR message the UE connected to a PCell not providing SIB12 including sl-ConfigCommonNR; or
     3> if the last transmission of the SidelinkUEInformationNR message did not include sl-TxResourceReqList; or if the information carried by the sl-TxResourceReqList has changed since the last transmission of the SidelinkUEInformationNR message:
    4> initiate transmission of the SidelinkUEInformationNR message to indicate the NR sidelink communication transmission resources required by the UE in accordance with 5.8.3.3;
2> else:
    3> if the last transmission of the SidelinkUEInformationNR message included sl-TxResourceReqList:
        4> initiate transmission of the SidelinkUEInformationNR message to indicate it no longer requires NR sidelink communication transmission resources in accordance with 5.8.3.3.

5.8.3.3 Actions Related to Transmission of SidelinkUEInformationNR Message

The UE shall set the contents of the SidelinkUEInformationNR message as follows:
    1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
        2> if SIB12 including sl-ConfigCommonNR is provided by the PCell:
            3> if configured by upper layers to receive NR sidelink communication:
                4> include sl-RxInterestedFreqList and set it to the frequency for NR sidelink communication reception;
            3> if configured by upper layers to transmit NR sidelink communication:
                4> include sl-TxResourceReqList and set its fields (if needed) as follows for each destination for which it requests network to assign NR sidelink communication resource:
                    5> set sl-DestinationIdentiy to the destination identity configured by upper layer for NR sidelink communication transmission;
                    5> set sl-CastType to the cast type of the associated destination identity configured by the upper layer for the NR sidelink communication transmission;
                    5> set sl-RLC-ModeIndication to include the RLC mode(s) and optionally QoS profile(s) of the sidelink QoS flow(s) of the associated RLC mode(s), if the associated bi-directional sidelink DRB has been established due to the configuration by RRCReconfigurationSidelink;
                    5> set sl-Failure as rlf for the associated destination for the NR sidelink communication transmission, if the sidelink RLF is detected;
                    5> set sl-Failure as configFailure for the associated destination for the NR sidelink communication transmission, if RRCReconfigurationFailureSidelink is received as sidelink RRC reconfiguration failure;
                    5> set sl-QoS-InfoList to include QoS profile(s) of the sidelink QoS flow(s) of the associated destination configured by the upper layer for the NR sidelink communication transmission;
                    5> set sl-InterestedFreqList to indicate the frequency for NR sidelink communication transmission;
                    5> set sl-TypeTxSyncList to the current synchronization reference type used on the associated sl-InterestedFreqUst for NR sidelink communication transmission.
                    5> set sl-CapabilityInformationSidelink to include UECapabilityInformationSidelink message, if any, received from peer UE.
    1> The UE shall submit the SidelinkUEInformationNR message to lower layers for transmission.

[ . . . ]

5.8.9.2 Sidelink UE Capability Transfer 5.8.9.2.1 General

This clause describes how the UE compiles and transfers its sidelink UE capability information for unicast to the initiating UE.

Figure 13:
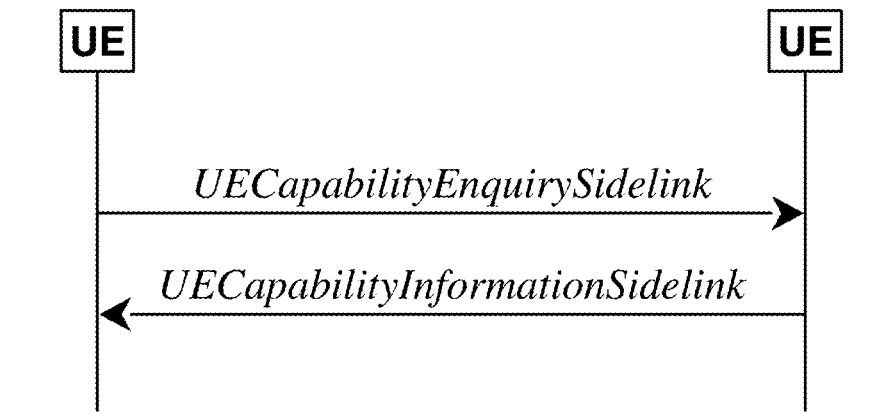
FIG. 13 is a reproduction of FIG. 5.8.9.2.1-1 of 3GPP R2-2005973.

FIG. 5.8.9.2.1-1 of 3GPP R2-2005973, Entitled Sidelink UE Capability Transfer", is Reproduced as FIG. 13

5.8.9.2.2 Initiation

The UE may initiate the sidelink UE capability transfer procedure upon indication from upper layer when it needs (additional) UE radio access capability information.

5.8.9.2.3 Actions Related to Transmission of the UECapabilityEnquirySidelink by the UE The initiating UE shall set the contents of UECapabilityEnquirySidelink message as follows:
    1> include in UE radio access capabilities for sidelink within ueCapabilityInformationSidelink;
    NOTE: It is up to initiating UE to decide whether ueCapabilityInformationSidelink should be included.
    1> set frequencyBandUstFilterSidelink to include frequency bands for which the peer UE is requested to provide supported bands and band combinations;
    1> submit the UECapabilityEnquirySidelink message to lower layers for transmission.

5.8.9.2.4 Actions Related to Reception of the UECapabilityEnquirySidelink by the UE The peer UE shall set the contents of UECapabilityInformationSidelink message as follows:
    1> include in UE radio access capabilities for sidelink within ueCapabilityInformationSidelink;
    1> compile a list of "candidate band combinations" only consisting of bands included in frequencyBandListFilter, and prioritized in the order of frequencyBandUstFilterSidelink (i.e. first include band combinations containing the first-listed band, then include remaining band combinations containing the second-listed band, and so on).
    1> Include into supportedBandCombinationListSidelink as many band combinations as possible from the list of "candidate band combinations", starting from the first entry;
    1> submit the UECapabilityInformationSidelink message to lower layers for transmission.

[ . . . ]

SidelinkParameters

The IE SidelinkParameters is used to convey capabilities related to NR sidelink communication.

SidelinkParameters Information Element

```
-- ASN1START
-- TAG-SIDELINKPARAMETERS-START
SidelinkParameters-r16 ::= SEQUENCE {
    rlc-ParametersSidelink-r16              RLC-ParametersSidelink-r16
OPTIONAL,
    mac-ParametersSidelink-r16              MAC-ParametersSidelink-r16
OPTIONAL,
    fdd-Add-UE-Sidelink-Capabilities-r16    UE-SidelinkCapabilityAddXDD-Mode-r16
OPTIONAL,
    tdd-Add-UE-Sidelink-Capabilities-r16    UE-SidelinkCapabilityAddXDD-Mode-r16
OPTIONAL,
    nonCriticalExtension                    SEQUENCE { }
OPTIONAL
}
RLC-ParametersSidelink-r16 ::= SEQUENCE {
    am-WithLongSN-Sidelink-r16              ENUMERATED {supported}       OPTIONAL,
    um-WithLongSN-Sidelink-r16              ENUMERATED {supported}       OPTIONAL,
    ...
}
MAC-ParametersSidelink-r16 ::= SEQUENCE {
    mac-ParametersSidelinkCommon-r16        MAC-ParametersSidelinkCommon-r16     OPTIONAL,
    mac-ParametersSidelinkXDD-Diff-r16      MAC-ParametersSidelinkXDD-Diff-r16   OPTIONAL,
    ...
}
UE-SidelinkCapabilityAddXDD-Mode-r16 ::=    SEQUENCE {
    mac-ParametersSidelinkXDD-Diff-r16          MAC-ParametersSidelinkXDD-Diff-r16   OPTIONAL
}
MAC-ParametersSidelinkCommon-r16 ::=        SEQUENCE {
    lcp-RestrictionSidelink-r16             ENUMERATED {supported}       OPTIONAL,
    multipleConfiguredGrantsSidelink-r16    ENUMERATED {supported}       OPTIONAL,
    ...
}
MAC-ParametersSidelinkXDD-Diff-r16 ::=      SEQUENCE {
    multipleSR-ConfigurationsSidelink-r16       ENUMERATED {supported}   OPTIONAL,
    logicalChannelSR-DelayTimerSidelink-r16     ENUMERATED {supported}   OPTIONAL,
    ...
}
-- TAG-SIDELINKPARAMETERS-STOP
-- ASN1STOP
```

UE-NR-Capability
The IE UE-NR-Capability is used to convey the NR UE Radio Access Capability Parameters, see TS 38.306 [26].

UE-NR-Capability Information Element

```
-- ASN1START
-- TAG-UE-NR-CAPABILITY-START
...
UE-NR-Capability-v16xy ::=       SEQUENCE {
    inDeviceCoexInd-r16              ENUMERATED {supported}
OPTIONAL,
    dl-DedicatedMessageSegmentation-r16   ENUMERATED {supported}
OPTIONAL,
    nru-Parameters-r16               NRU-Parameters-r16
OPTIONAL,
    sidelinkParameters-r16           SidelinkParameters-r16
OPTIONAL,
    bandCombinationListSidelink-r16  BandCombinationListSidelink-r16
OPTIONAL,
    nonCriticalExtension             SEQUENCE { }
OPTIONAL
}
...
-- TAG-UE-NR-CAPABILITY-STOP
-- ASN1STOP
```

3GPP TR 23.752 introduces the issue on support of UE-to-UE Relay and related solutions for a new release (i.e. Release 17) as follows:

5.4 Key Issue #4: Support of UE-to-UE Relay 5.4.1 General Description

This key issue intends to support for UE-to-UE Relay, including support for in coverage and out of coverage operation.

At least the following aspects need to be considered in potential solutions:

How to (re)-select a UE-to-UE Relay UE in proximity?
Whether and how for the network can control the UE-to-UE Relay operation, at least including how to:
Authorize the UE-to-UE Relay, e.g. authorize a UE as UE-to-UE Relay?
Provide the visibility of source/target UE and the UE-to-UE Relay to the network for the purpose of, e.g. charging?
How to establish the connection between the source UE and the target UEs via UE-to-UE Relay?
How to provide end-to-end QoS framework to satisfy the QoS requirements (such as data rate, reliability, latency)?
How to enhance the system architecture to provide the security protection for relayed connection?
How to provide a mechanism for path changing in case of e.g. UE-to-UE Relay changes?
NOTE 1: For the involvement of NG-RAN, coordination with RAN WGs is needed.
NOTE 2: For security aspects, coordination with SA3 is needed.

[ . . . ]

6.8 Solution #8: UE-to-UE Relay Selection without Relay Discovery 6.8.1 Description This proposal aims to ensure the relay discovery between the source and the target UE shall not be dependent on how the relay forward traffic between the source and the target UE, e.g. L2 or L3 relaying. This solution relies on the concept that the UE-to-UE discovery and selection can be integrated into the unicast link establishment procedure as described in clause 6.3.3 of TS 23.287 [5].

A new field is proposed to be added in the direct communication request to indicate whether relays can be used in the communication. The field can be called relay_indication. When a UE wants to broadcast a direct communication request, it indicates in the message whether a UE-to-UE relay could be used. For Release 17, it is assumed that the value of the indication is restricted to single hop.

When a UE-to-UE relay receives a direct communication request with the relay_indication set, then it shall decide whether to forward the request (i.e. broadcast this request in its proximity), according to e.g. the QoS requirements in the request, the current traffic load of the relay, the radio conditions between the source UE and the relay UE, or some other policies (e.g. it only serves some specific UEs or services).

It may be the situation where multiple UE-to-UE relays can be used to reach the target UE or the target UE may also directly receive the direct communication request from the source UE. The target UE may choose which one to reply according to e.g. signal strength, local policy (e.g. traffic load of the UE-to-UE relays) or operator policies (e.g. always prefer direct communication or only use some specific UE-to-UE relays).

The source UE may receive the direct communication accept message from multiple UE-to-UE relays and also from the target UE directly, the source UE chooses the communication path according to e.g. signal strength, local policy (e.g. traffic load of the UE-to-UE relays) or operator policies (e.g. always prefer direct communication or only use some specific UE-to-UE relays).

6.8.2 Procedures

Figure 14:
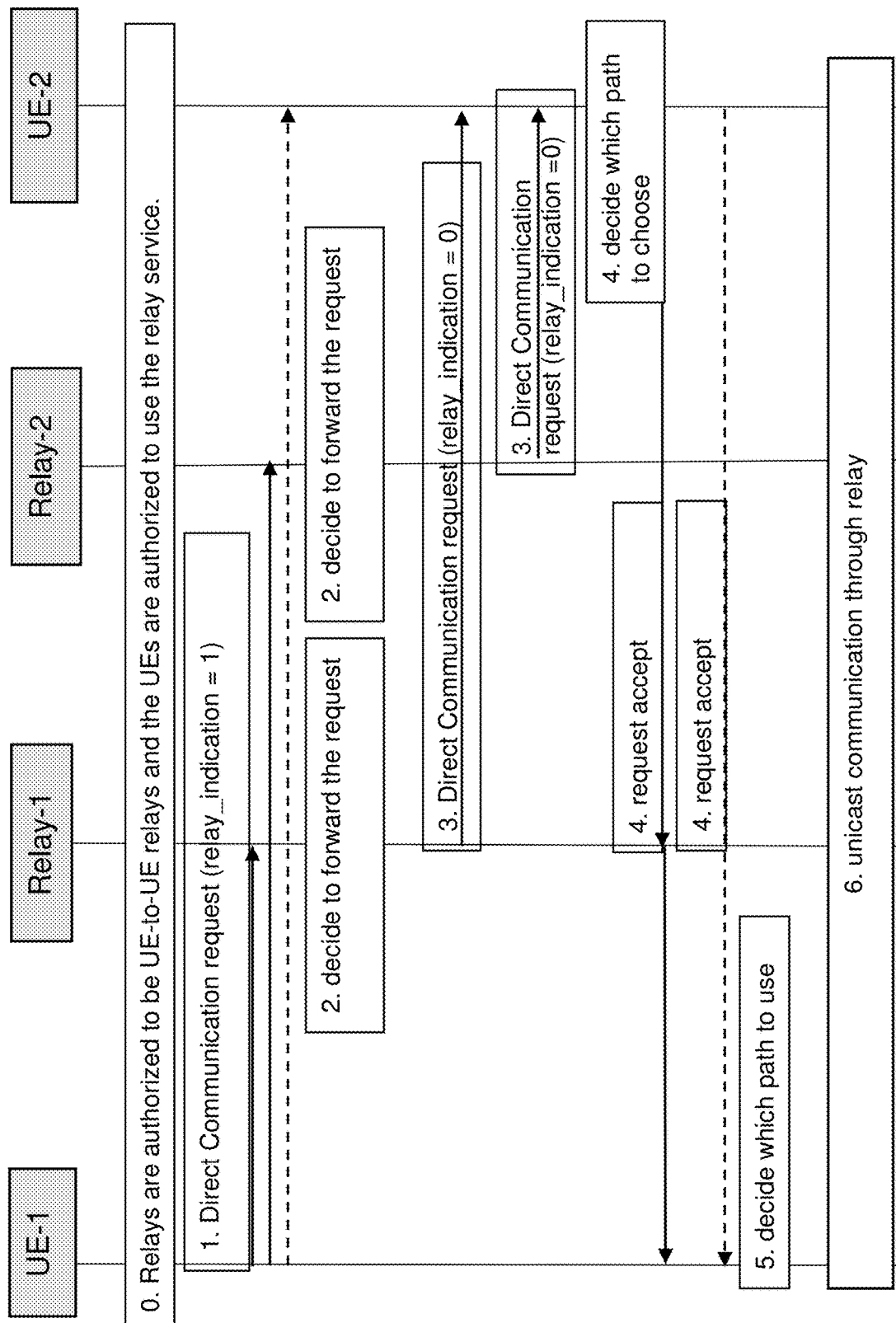
FIG. 14 is a reproduction of FIG. 6.8.2-1 of 3GPP TR 23.752 V0.3.0.

FIG. 6.8.2-1 of 3GPP TR 23.752 V0.3.0, Entitled "5G ProSe UE-to-UE Relay Selection", is Reproduced as FIG. 14

FIG. 6.8.2-1 illustrates the procedure of the proposed method.

0. UEs are authorized to use the service provided by the UE-to-UE relays. UE-to-UE relays are authorized to provide service of relaying traffic among UEs. The authorization and the parameter provisioning can use solutions for KI #8.

1. UE-1 wants to establish unicast communication with UE-2 and the communication can be either through direct link with UE-2 or via a UE-to-UE relay. Then UE-1 broadcasts directly communication request with relay_indication=1. The request will be received by relay-1, relay-2. The request may also be received by UE-2 if it is in the proximity of UE-1.

2. Relay-1 and relay-2 decide to forward the request. They broadcast the message in their proximity with relay_indication=0. If a relay receives this message, it will just drop it.

3. UE-2 receives the requests from relay-1 and relay-2.

4. UE-2 chooses relay-1 and replies with request accept. If UE-2 directly receives the direct communication request from UE-1, it may choose to setup a direct communication link by sending the request accept directly to UE-1. The response message includes indication on the type of communication link being established (e.g. via relay or direct).

5. UE-1 receives the request accept from relay-1. UE-1 chooses path according to e.g. policies (e.g. always choose direct path if it is possible), signal strength, etc. If UE-1 receives request accept directly from UE-2, it may choose to setup a direct L2 link as described in clause 6.3.3 of TS 23.287 [5], then step 6 is skipped.

6. UE-1 and UE-2 setup communication link through chosen UE-to-UE relay. The link setup information may vary depending on the type of relay, e.g. L2 or L3 relaying.

NOTE 1: In order to make a relay or path selection, the source UE can setup a timer after sending out the direct communication request for collecting the corresponding request accept messages before making a decision. Similarly, the target UE can also setup a timer after receiving the first copy of the direct communication request for collecting multiple copies of the request from different paths before making a decision.

NOTE 2: In the first time when a UE receives a message from a UE-to-UE relay, the UE needs to verify if the relay is authorized be a UE-to-UE relay. The verification details and the how to secure the communication between two UEs through a UE-to-UE relay is to be defined by SA WG3.

6.8.3 Impacts on Existing Nodes and Functionality

UE impacts to support new Relay related functions.

6.9 Solution #9: Connection Establishment Via UE-to-UE Layer-2 Relay

6.9.1 Description

Using the solution described in this clause, a UE-to-UE Relay enables the discovery of a source UE by a target UE. A UE-to-UE Relay is authorized to relay messages between two UEs over the PC5 interface via authorization and provisioning, as defined in clause 6.Y Solution for Key Issue #4: UE-to-UE Relay Authorization and Provisioning.

The source UE announces its supported applications or discovers a target UE using a known discovery mechanism, e.g. using user-oriented or service-oriented methods as defined in TS 23.287 [5].

The UE-to-UE Relay listens for ProSe applications advertisements (e.g. Direct Discovery or Direct Communication Request messages) from surrounding UEs and if a broadcasted application matches one of the applications from its provisioned relay policy/parameters, the UE-to-UE Relay advertises it as a relayed application by adding a relay indication to the message.

A target UE discovers a source UE via a UE-to-UE Relay. The target UE receives a broadcast Direct Communication Request message with a relay indication.

A secured "extended" PC5 link is set up between the source UE and the target UE via the UE-to-UE Relay. The source/target UEs do not know their respective peer UE's L2 IDs. Source/Target UEs send messages to the UE-to-UE Relay and receive messages through the UE-to-UE Relay. However, the security association and the PC5 unicast link are established directly between the source UE and target UE. The UE-to-UE Relay forwards the messages in opaque mode, without the ability to read, modify their content or replay them. The source/target UEs detect that the communication is going through a UE-to-UE Relay upon detecting a relay indication included in the received messages.

The UE-to-UE Relay assigns itself two Relay-L2 IDs when a unicast link is established between two peer UEs via the UE-to-UE Relay. The first Relay-L2 ID is used when forwarding a message to the target UE. The second Relay-L2 ID is used when forwarding a message to the source UE. The UE-to-UE Relay maintains a mapping table containing the mapping of peer UEs L2 IDs and the corresponding Relay-L2 IDs that have been self-assigned. When receiving a message, the UE-to-UE Relay uses its mappings table to find the source and destination IDs to be used to forward the message to the target UE. The UE-to-UE Relay uses the Relay-L2 ID specified in the destination field to find the related UE and uses the UE's L2 ID specified in the source field to find the related Relay-L2 ID. It then updates the source and destination fields of the received message with its corresponding UE's L2 ID and Relay-L2 ID before forwarding the message.

> NOTE: Additional security-related parameters and procedures may be needed for the protection of relay related messages. Their definitions need to be coordinated with SA WG3.

6.9.2 Procedures

The two methods defined in TS 23.287 [5], i.e. service-oriented and user-oriented are supported using the procedure described in this clause.

FIG. 6.9.2-1 shows the peer discovery and unicast link establishment over PC5 reference point via a UE-to-UE Relay.

Figure 15:
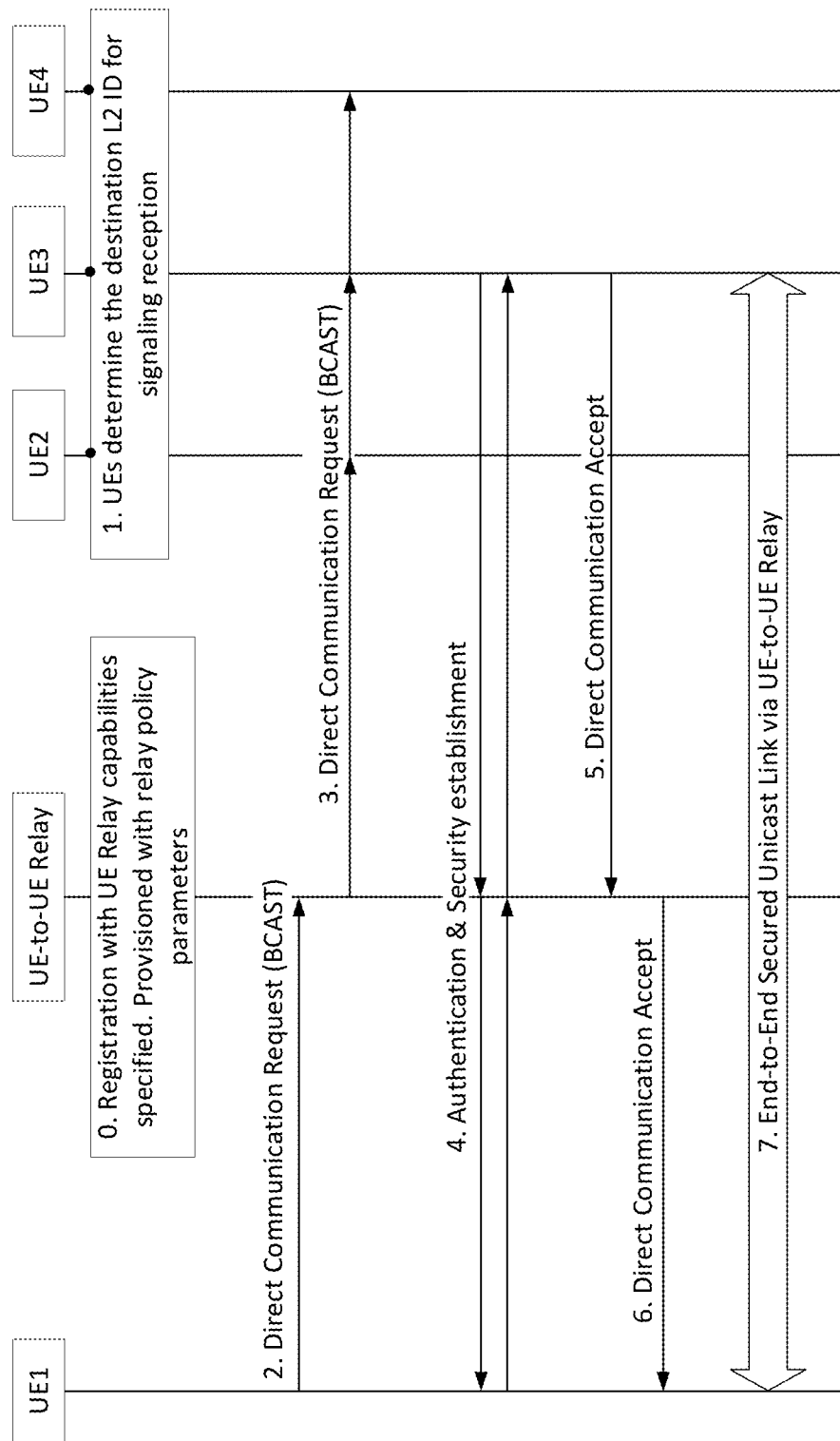
FIG. 15 is a reproduction of FIG. 6.9.2-1 of 3GPP TR 23.752 V0.3.0.

FIG. 6.9.2-1 of 3GPP TR 23.752 V0.3.0, Entitled "Connection Establishment Procedure Via a UE-to-UE Relay", is Reproduced as FIG. 15

0. UE-to-UE Relay registers with the network and specifies its UE-to-UE Relay capabilities. UE-to-UE Relay is provisioned from the network with relay policy parameters and with a unique Relay identifier (RID).
1. The target UEs (i.e. UE2, UE3 and UE4) determine the destination Layer-2 ID for signalling reception for PC5 unicast link establishment as specified in TS 23.287 [5] clause 5.6.1.4. The destination Layer-2 ID is configured with the target UEs as specified in TS 23.287 [5] clause 5.1.2.1.
2. On the source UE (i.e. UE1), the application layer provides information to the ProSe layer for PC5 unicast communication (e.g. broadcast Layer-2 ID, ProSe Application ID, UE's Application Layer ID, target UE's Application Layer ID, relay applicable indication), as specified in TS 23.287 [5] clause 6.3.3.1.
3. ProSe layer triggers the peer UE discovery mechanism by sending a broadcast Direct Communication Request message. The message is sent using the source Layer-2 ID and broadcast Layer-2 ID as destination, and includes other parameters related to the application offered, as specified in TS 23.287 [5] clause 6.3.3.1.
4. The UE-to-UE Relay receives the broadcast Direct Communication Request message and verifies if it's configured to relay this application, i.e. it compares the announce ProSe Application ID with its provisioned relay policy/parameters and, if it matches, the UE-to-UE Relay assigns itself a Relay-Layer-2 ID (e.g. R-L2 ID-a) for UE1 (i.e. related to UE1's L2 ID).

These 2 IDs (UE1's Layer-2 ID and Relay-Layer-2 ID-a) are saved in a local mapping table. The UE-to-UE Relay overrides the source field of the message with its R-L2 ID-a and adds its unique relay identifier (RID) as a relay indication. This relay indication is added by the UE-to-UE Relay only on broadcast messages since these messages are sent in clear text (i.e. without any encryption or integrity protection) thus may be modified. The UE-to-UE Relay proceeds in forwarding the broadcast Direct Communication Request message received from the source UE.

5. Target UE3 is interested in the announced application thus, it triggers the authentication and security establishment with UE1, via the UE-to-UE Relay. UE3 keeps track of the Relay's identifiers, i.e. R-L2 ID-a and RID. UE3 sends the RID in a security protected message during the authentication and security establishment to inform UE1 that the communication is traversing the UE-to-UE Relay identified by RID.

UE-to-UE Relay receives the message from UE3 and uses the R-L2 ID-a specified in the destination field to find the related UE (i.e. UE1 in this case) in its mapping table.

UE-to-UE Relay assigns itself a new Layer-2 ID (e.g. R-L2 ID-b) for UE3 and stores the mapping between UE3's L2 ID and R-L2 ID-b.

UE-to-UE Relay sets the source field of the message to R-L2 ID-b and sets the destination field to UEVs Layer-2 ID (i.e. L2 ID1) retrieved from the mapping entry. UE-to-UE Relay sends the message to UE1.

UE1 receives the authentication message and keeps track of R-L2 ID-b and RID. R-L2 ID-b is used as the destination on subsequent messages destined to UE3 and sent via the UE-to-UE Relay.

Authentication and security establishment messages are exchanged between UE1 and UE3 via the UE-to-UE Relay. UE-to-UE Relay changes the source/destination Layer-2 IDs based on the information saved in its local mapping table.

> Editor's note: The Details of the authentication and security procedure will be investigated by SA WG3 group.

6. Once the security is established, UE3 completes the unicast link establishment by sending a Direct Communication Accept message.
7. UE-to-UE Relay receives the message and sets the source field of the message to the R-L2 ID-b as found in the mapping entry and sets the destination field to the UE1's L2 ID also from the mapping entry. UE-to-UE Relay sends the modified message to UE1.
8. An "extended" unicast link is established between UE1 and UE3, via the UE-to-UE Relay. The extended link is secured end to end, i.e. a security association has been created between UE1 and UE3. Confidentiality and/or integrity/replay protected messages (i.e. data or PC5-S) may be exchanged between UE1 and UE3. The UE-to-UE Relay is not involved in the security association thus it cannot read nor modify the secured portion of the message (which excludes the source and destination fields).

Editor's note: The details of protocol stack and PC5 link establishment is FFS and need to be co-ordinated and confirmed by RAN WG2 group.

6.9.3 Impacts on Services, Entities and Interfaces

The solution has impacts in the following entities:

UE:
  Needs to support procedures for ProSe 5G UE-to-UE Relay and communications via a ProSe 5G UE-to-UE Relay.

6.10 Solution #10: ProSe 5G Layer-3 UE-to-UE Relay Based on IP Routing 6.10.1 Description In this solution, the ProSe 5G UE-to-UE Relay operations is supported with the following principles:

Authorization and configuration:
  Only the UE authorized by the service authorization configuration can act as a ProSe 5G UE-to-UE Relay. These UEs will be configured according to the service authorization and provisioning mechanism defined in TS 23.287 [5] to operate in the UE-to-UE Relay mode.

ProSe 5G UE-to-UE Relay discovery:
  The ProSe 5G UE-to-UE Relay sends out a Relay Discovery message periodically, announcing its availability for serving other UEs in the area.
  The ProSe 5G UE-to-UE Relay also supports the query and response mode for discovery. The ProSe 5G UE-to-UE Relay listens on a configured Layer-2 ID for the query, and would respond with its address and corresponding information to enable to other UE to establish a unicast connection with it. This process is similar to the unicast L2 link establishment procedure as defined in TS 23.287 [5] clause 6.3.3.1.
  NOTE 1: The Layer-2 ID used for the discovery can be specific for UE-to-UE Relay discovery, or shared with other discoveries, e.g. UE-to-Network Relay discovery.

ProSe 5G UE-to-UE Relay operation:
  Any UE that wants to make use of the ProSe 5G UE-to-UE Relay needs to establish a unicast L2 link with the UE-to-UE Relay, with IP configuration. The ProSe 5G UE-to-UE Relay allocates IP address/prefix to the other UEs.
  As part of the unicast L2 link establishment procedure, the ProSe 5G UE-to-UE Relay stores an association of the User Info of the peer UE of the unicast link and the IP address/prefix allocated to the UE into its DNS entries. The ProSe 5G UE-to-UE Relay acts as a DNS server to other UEs.
  When a (source) UE needs to communicate with another (target) UE or needs to discover a ProSe service via the ProSe 5G UE-to-UE Relay, it sends a DNS query for the target UE (based on Target User Info) or for the ProSe Service to the ProSe 5G UE-to-UE Relay over the unicast link, which will return the IP address/prefix of the target UE or the ProSe Service.
  The source UE sends the IP data or non-IP data encapsulated in IP to the target UE via the unicast L2 link to UE-to-UE Relay that returned the IP address/prefix of the target UE. The ProSe 5G UE-to-UE Relay acts as an IP router, and forwards the packets to the corresponding unicast L2 link towards the target UE. Each of the unicast L2 link is treated as an IP interface.
  If there are multiple ProSe 5G UE-to-UE Relays in the proximity, UE can choose either one or more ProSe 5G UE-to-UE Relays to establish the unicast L2 link based on UE implementation. For example, the UE sends a DNS query on each of the unicast L2 link to the ProSe 5G UE-to-UE Relays. Then, the source UE may choose to use the first ProSe 5G UE-to-UE Relay that returns a positive DNS query for the target UE.
  NOTE 2: The selection of the UE-to-UE Relay may be based on local configured rules on the UE, or based on other discovery solutions, e.g. "Stateful UE-to-UE Relay" described in clause 6.11.

QoS handling:
  When the source UE establishes the unicast L2 link with the ProSe 5G UE-to-UE Relay, it can establish corresponding PC5 QoS Flows according to procedure defined in clause 6.3.3.1 of TS 23.287 [5]. It can also modify the PC5 QoS Flows at any time using procedure defined in clause 6.3.3.4 of TS 23.287 [5].
  Correspondingly, the ProSe 5G UE-to-UE Relay can also establish and modify the PC5 QoS Flows using the above-mentioned procedures over the unicast L2 Link with the target UE for the forwarding of source UE's traffic.

Security handling:
  source UE and target UE can establish bearer level security with the UE-to-UE Relay for the unicast L2 Link, using procedures defined in TS 23.287 [5].
  If end-to-end security protection is required between source UE and target UE, IPSec can be used.
  NOTE 3: The security protection of the traffic of source UE and target UE will be specified by SA WG3.

Charging Support:
  ProSe 5G UE-to-UE Relay can follow the charging solution defined in TS 32.277 [13] to report the source and target UEs and corresponding traffic to the charging function.

6.10.2 Procedures

Figure 16:
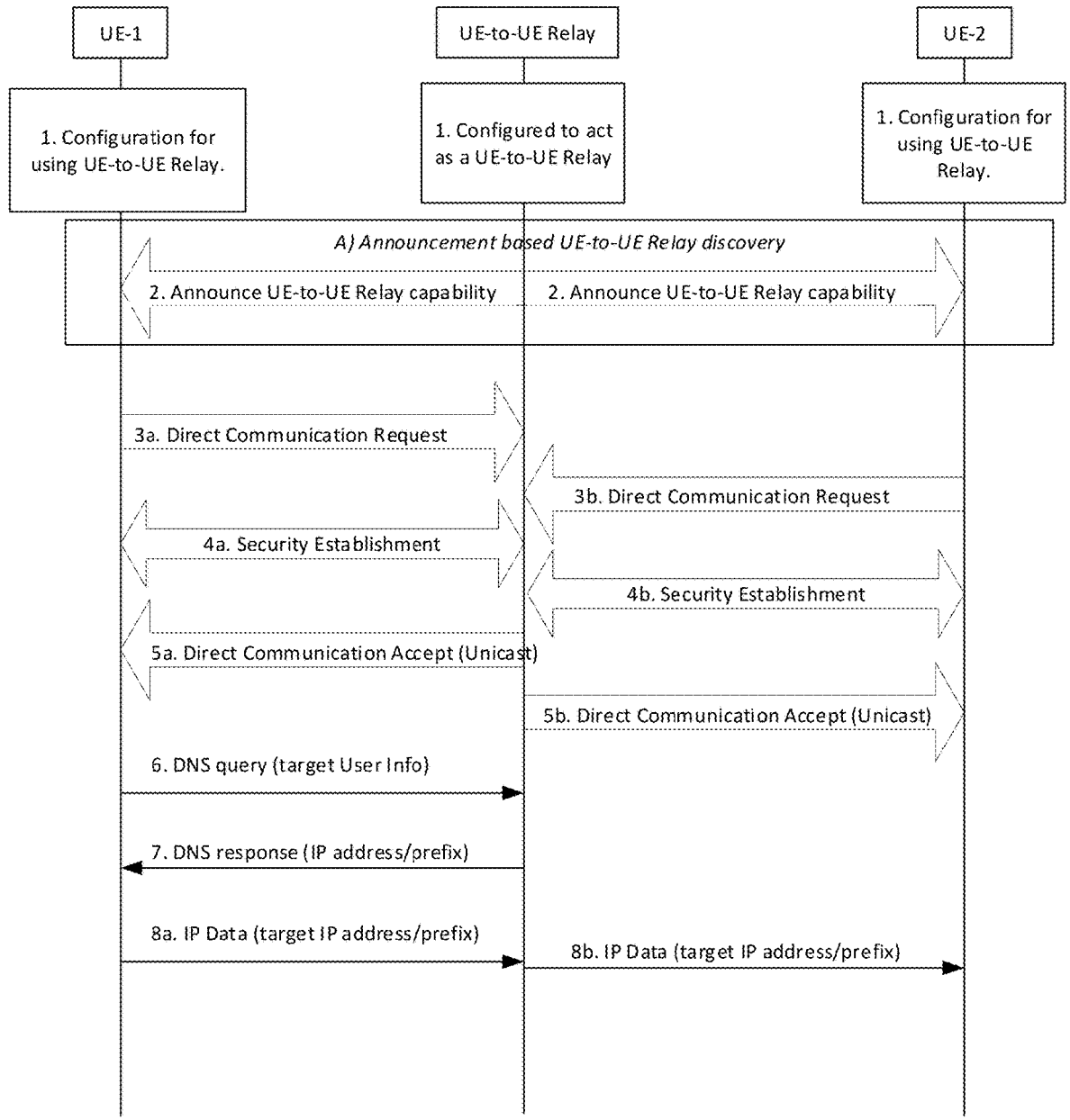
FIG. 16 is a reproduction of FIG. 6.10.2-1 of 3GPP TR 23.752 V0.3.0.

FIG. 6.10.2-1 of 3GPP TR 23.752 V0.3.0, Entitled "5G ProSe UE-to-UE Relay Operation", is Reproduced as FIG. 16

FIG. 6.10.2-1 provides an example operation for the 5G ProSe UE-to-UE Relay operation based on standard IP operation.

6.10.3 Impacts on Services, Entities and Interfaces

There is no impact to NG-RAN, as the solution is using the existing features supported in Rel-16 NR V2X design.

UEs operates with existing IP operation, and the ProSe 5G UE-to-UE Relay supports the IP router function (for address allocation and traffic forwarding) and the functionality of a DNS server.

[ . . . ]

In a legacy NR system (as discussed in 3GPP TS 38.331), a UE shall report its UE capability information to gNB and the UE capability information includes sidelink UE capability information (i.e. SidelinkParameters) of the UE. Two UEs engaged in unicast communication shall exchange sidelink UE capability information in the sidelink UE capability transfer procedure. In addition, the UE shall include the UECapabilityInformationSidelink message received from the peer UE in a SidelinkUEinformationNR message reported to gNB (as discussed in 3GPP R2-2005973).

Besides, a UE needs to transmit a Sidelink UE Information message (i.e. a SidelinkUEinformationNR message) to gNB to request sidelink resource (or sidelink configuration) for sidelink communication with a destination (as discussed in 3GPP TS 38.331), wherein the destination included in this message may be a peer UE (for a direct sidelink communication) or a UE-to-UE Relay (for a sidelink communication via the Relay).

Figure 17:
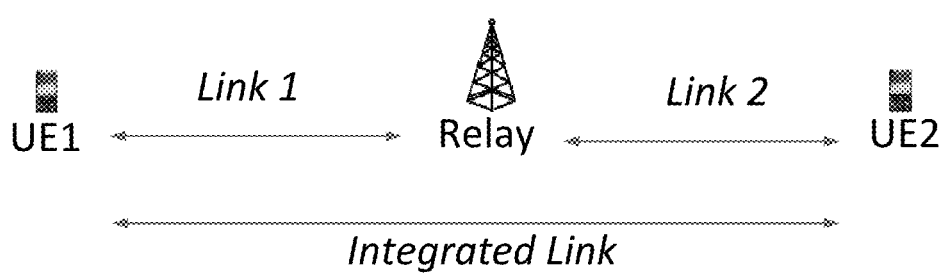
FIG. 17 illustrates an exemplary integrated PC5 unicast link via a UE-to-UE Relay according to one embodiment.

Key issue #4 in 3GPP TR 23.752 describes support of UE-to-UE Relay in the next release (i.e. Release 17), which means a relay may be used to support data communication between two UEs in case these two UEs cannot communicate with each other directly. It is supposed that a UE-to-UE Relay needs to establish one PC5 unicast link with each of a Source UE and a Target UE such that the integrated PC5 unicast link between the Source UE and the Target UE can support the concerned ProSe service as illustrated in FIG. 17, which shows an example of Integrated PC5 unicast link via a User Equipment-to-User Equipment (UE-to-UE) Relay according to one embodiment.

Given two PC5 unicast links are established between a UE-to-UE Relay and each of the Source UE and the Target UE, it is possible that the data rates on these two PC5 unicast links may be different because different sets of UE capability information are taken into consideration by gNB to allocate sidelink DRB configurations for both PC5 unicast links. In this situation, data from one side may accumulate in the buffer of the UE-to-UE Relay, which may cause problems in the UE-to-UE Relay e.g. data loss due to shortage of buffer.

Figure 18:
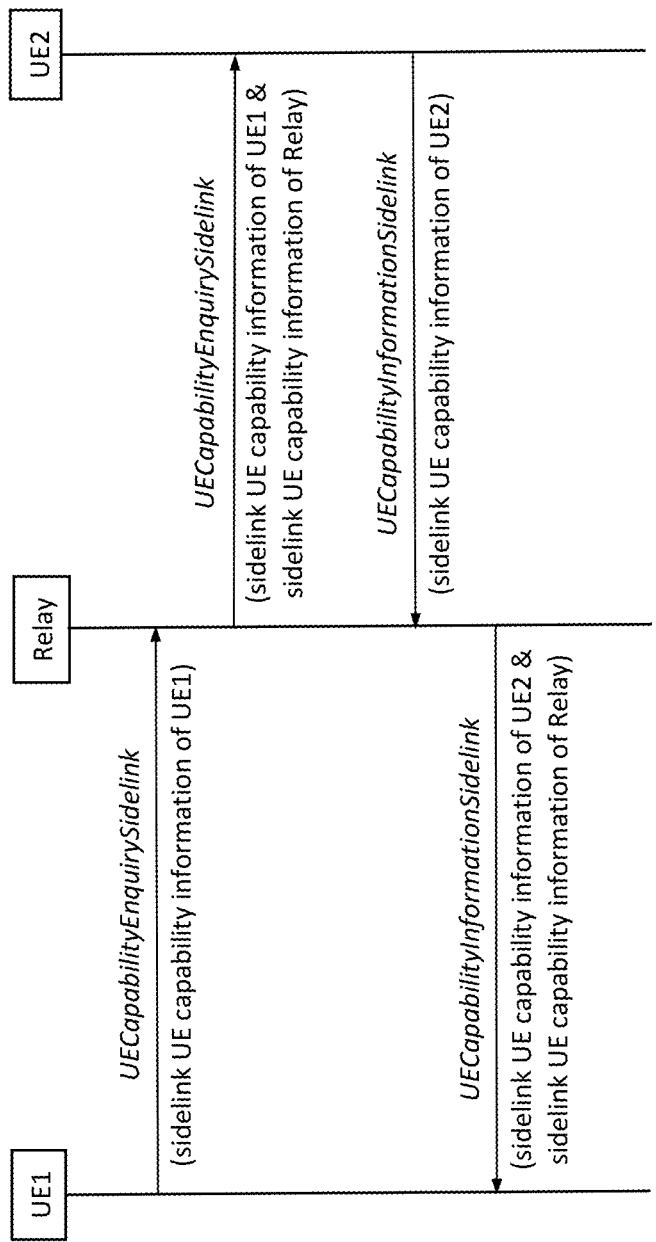
FIG. 18 illustrates an exemplary integrated sidelink UE capability transfer procedure according to one embodiment.

To ensure similar data rates on both PC5 unicast links, one potential way is for the UE-to-UE Relay to transfer the sidelink UE capability information of one UE (e.g. the Source UE) to the other UE (e.g. the Target UE), in addition to the sidelink UE capability information of the UE-to-UE Relay, so that the UE may transmit the peer UE's sidelink UE capability information to gNB for requesting sidelink resource (or sidelink configuration). For example, the UE may include the peer UE's sidelink UE capability information and the UE-to-UE Relay's sidelink UE capability information in a Sidelink UE Information message sent to gNB. It is also feasible for the UE to include a combined sidelink UE capability information, which is derived from the peer UE's sidelink UE capability information and the UE-to-UE Relay's sidelink UE capability information e.g. a value of a lower capability between two capability parameters in both the peer UE's sidelink UE capability information and the UE-to-UE Relay's sidelink UE capability information is selected to form a corresponding capability parameter in the combined sidelink UE capability information. FIG. 18 shows an example of an integrated sidelink UE capability transfer procedure performed by three parties including the UE (UE1), the UE-to-UE Relay, and the peer UE (UE2), according to one embodiment.

It is also possible for the UE to transmit the peer UE's sidelink UE capability information and the UE-to-UE Relay's sidelink UE capability information in two separate RRC messages to gNB.

Alternatively, the UE-to-UE Relay may transmit, to one UE, a combined sidelink UE capability information, which is derived from the UE-to-UE Relay's sidelink UE capability information and the peer UE's sidelink UE capability information as described above. By this way, the UE may just include the combined sidelink UE capability information in the Sidelink UE Information message sent to gNB.

To support the above general concepts, the UE-to-UE Relay may transmit both UEs' sidelink UE capability information to gNB when requesting sidelink resource (or sidelink configuration) for the sidelink communication. It is also feasible for the UE-to-UE Relay to transmit a combined sidelink UE capability information, which is derived from both UEs' sidelink UE capability information as described above.

Basically, each of the Source UE, the Target UE, and the UE-to-UE Relay may transmit its own sidelink UE capability information to its serving gNB in a UECapabilityInformation message after connecting with the gNB.

It is possible that a new term may be used for the sidelink UE capability information of a UE-to-UE Relay if there is a need to distinguish a UE-to-UE Relay from a UE. In this situation, another term may also be used for the combined sidelink UE capability information.

Figure 19:
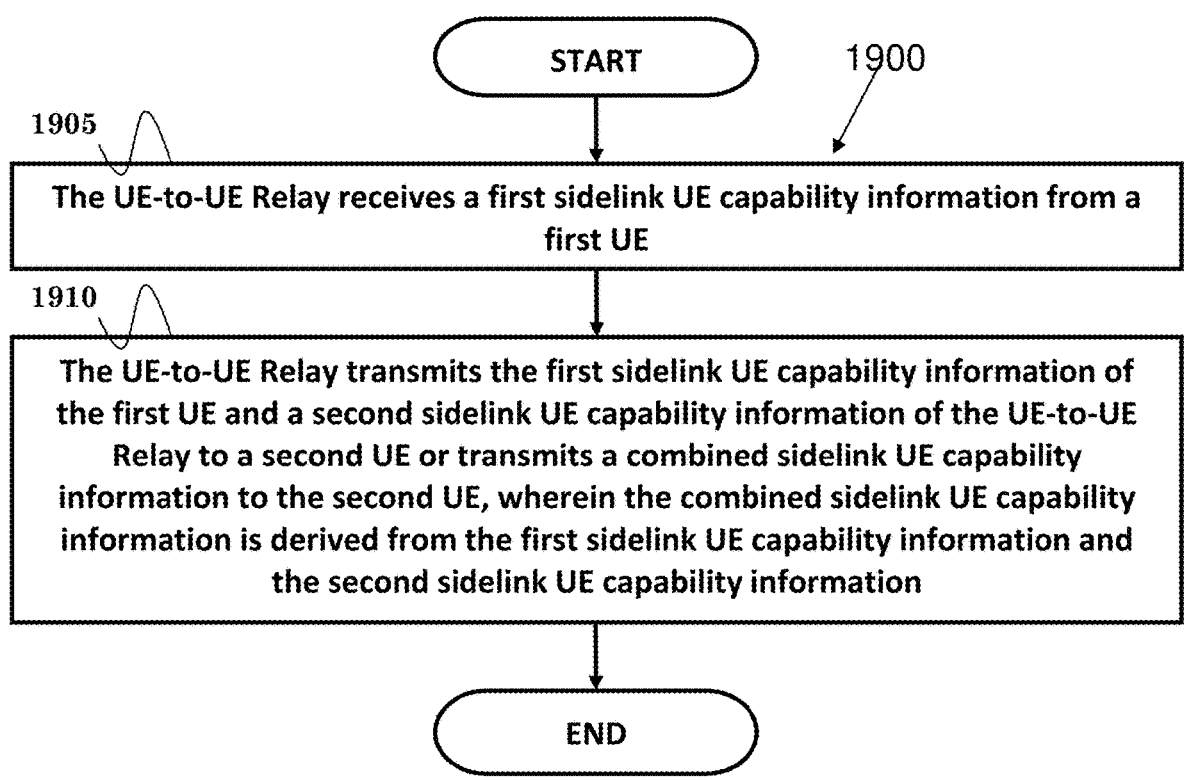
FIG. 19 is a flow chart according to one exemplary embodiment.

FIG. 19 is a flow chart 1900 according to one exemplary embodiment from the perspective of a User Equipment-to-User Equipment (UE-to-UE) Relay to forward sidelink UE capability information. In step 1905, the UE-to-UE Relay receives a first sidelink UE capability information from a first UE. In step 1910, the UE-to-UE Relay transmits the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information.

In one embodiment, the first UE may communicate with the second UE via the UE-to-UE Relay. The first sidelink UE capability information may be received via a first PC5 Radio RRC message. The first PC5 RRC message may be a UECapabilityEnquirySidelink message or a UECapabilityInformationSidelink message.

In one embodiment, the first sidelink UE capability information and the second sidelink UE capability information may be transmitted via one second PC5 RRC message or two separate second PC5 RRC messages. The second PC5 RRC message may be a UECapabilityEnquirySidelink message or a UECapabilityInformationSidelink message.

In one embodiment, the combined sidelink UE capability information may be transmitted via a third PC5 RRC message. The third PC5 RRC message may be a UECapabilityEnquirySidelink message or a UECapabilityInformationSidelink message.

In one embodiment, a value of a lower capability between two capability parameters in the first sidelink UE capability information and the second sidelink UE capability information may be selected to form a corresponding capability parameter in the combined sidelink UE capability information.

Referring back to FIGS. 3 and 4, in one exemplary embodiment of a (UE-to-UE) Relay to forward sidelink UE capability information. The UE-to-UE Relay 300 includes a program code 312 stored in the memory 310. The CPU 308 could execute program code 312 to enable the UE-to-UE Relay (i) to receive a first sidelink UE capability information from a first UE, and (ii) to transmit the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment-to-User Equipment (UE-to-UE) Relay to forward sidelink UE capability information, comprising:
   the UE-to-UE Relay receives a first sidelink UE capability information from a first UE; and
   the UE-to-UE Relay transmits the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information.

2. The method of claim 1, wherein the first UE communicates with the second UE via the UE-to-UE Relay.

3. The method of claim 1, wherein the first sidelink UE capability information is received via a first PC5 Radio Resource Control (RRC) message.

4. The method of claim 3, wherein the first PC5 RRC message is a UECapabilityEnquirySidelink message or a UECapabilityInformationSidelink message.

5. The method of claim 1, wherein the first sidelink UE capability information and the second sidelink UE capability information are transmitted via one second PC5 Radio Resource Control (RRC) message or two separate second PC5 RRC messages.

6. The method of claim 5, wherein the second PC5 RRC message is a UECapabilityEnquirySidelink message or a UECapabilityInformationSidelink message.

7. The method of claim 1, wherein the combined sidelink UE capability information is transmitted via a third PC5 Radio Resource Control (RRC) message.

8. The method of claim 7, wherein the third PC5 RRC message is a UECapabilityEnquirySidelink message or a UECapabilityInformationSidelink message.

9. The method of claim 1, wherein a value of a lower capability between two capability parameters in the first sidelink UE capability information and the second sidelink UE capability information is selected to form a corresponding capability parameter in the combined sidelink UE capability information.

10. A User Equipment-to-User Equipment (UE-to-UE) Relay, comprising:
    a control circuit;
    a processor installed in the control circuit; and
    a memory installed in the control circuit and operatively coupled to the processor;
    wherein the processor is configured to execute a program code stored in the memory to:
    receive a first sidelink UE capability information from a first UE; and
    transmit the first sidelink UE capability information of the first UE and a second sidelink UE capability information of the UE-to-UE Relay to a second UE or transmits a combined sidelink UE capability information to the second UE, wherein the combined sidelink UE capability information is derived from the first sidelink UE capability information and the second sidelink UE capability information.

11. The UE-to-UE Relay of claim 10, wherein the first UE communicates with the second UE via the UE-to-UE Relay.

12. The UE-to-UE Relay of claim 10, wherein the first sidelink UE capability information is received via a first PC5 Radio Resource Control (RRC) message.

13. The UE-to-UE Relay of claim 12, wherein the first PC5 RRC message is a UECapabilityEnquirySidelink message or a UECapabilityInformationSidelink message.

14. The UE-to-UE Relay of claim 10, wherein the first sidelink UE capability information and the second sidelink UE capability information are transmitted via one second PC5 Radio Resource Control (RRC) message or two separate second PC5 RRC messages.

15. The UE-to-UE Relay of claim 14, wherein the second PC5 RRC message is a UECapabilityEnquirySidelink message or a UECapabilityInformationSidelink message.

16. The UE-to-UE Relay of claim 10, wherein the combined sidelink UE capability information is transmitted via a third PC5 Radio Resource Control (RRC) message.

17. The UE-to-UE Relay of claim 16, wherein the third PC5 RRC message is a UECapabilityEnquirySidelink message or a UECapabilityInformationSidelink message.

18. The UE-to-UE Relay of claim 10, wherein a value of a lower capability between two capability parameters in the first sidelink UE capability information and the second sidelink UE capability information is selected to form a corresponding capability parameter in the combined sidelink UE capability information.

* * * * *